United States Patent [19]

Aldred et al.

[11] Patent Number: 5,539,886
[45] Date of Patent: Jul. 23, 1996

[54] CALL MANAGEMENT IN A COLLABORATIVE WORKING NETWORK

[75] Inventors: Barry K. Aldred; Gordon W. Bonsall, both of Winchester; Howard S. Lambert, Southampton; Harry D. Mitchell, Richmond-upon-Thames, all of United Kingdom

[73] Assignee: International Business Machines Corp., Armonk, N.Y.

[21] Appl. No.: 256,209

[22] PCT Filed: Nov. 10, 1993

[86] PCT No.: PCT/GB93/02314

§ 371 Date: Jun. 27, 1994

§ 102(e) Date: Jun. 27, 1994

[87] PCT Pub. No.: WO94/11813

PCT Pub. Date: May 26, 1994

[30] Foreign Application Priority Data

Nov. 10, 1992 [GB] United Kingdom ............... 9223520

[51] Int. Cl.⁶ .................................................. G06F 15/177
[52] U.S. Cl. ............... 395/200.04; 395/800; 395/155; 395/153; 395/650; 364/281.3; 379/202
[58] Field of Search ..................... 395/200, 800, 395/200.04, 650; 364/DIG. 2, DIG. 1

[56] References Cited

U.S. PATENT DOCUMENTS

| | | | |
|---|---|---|---|
| 4,943,996 | 7/1990 | Baker, Jr. et al. | 379/96 |
| 5,008,853 | 4/1991 | Bly et al. | 364/DIG. 2 |
| 5,195,086 | 3/1993 | Baumgartner et al. | 370/62 |
| 5,206,934 | 4/1993 | Naef, III | 395/200 |
| 5,208,912 | 5/1993 | Nakayama et al. | 395/200 |
| 5,280,583 | 1/1994 | Nakayama et al. | 395/200 |
| 5,293,619 | 3/1994 | Dean | 395/650 |
| 5,375,068 | 12/1994 | Palmer et al. | 364/514 |
| 5,379,374 | 1/1995 | Ishizaki et al. | 395/155 |
| 5,392,400 | 2/1995 | Berkowitk et al. | 395/200 |

OTHER PUBLICATIONS

Watabe et al., "Distributed Desktop Conferencing System with Multiuser Multimedia Interface", *IEEE Journal on Selected Areas in Communications*, May 1991, pp. 531–539.
Wolff et al., "A Functional Model and Analysis of Personal Communications Services", *Supercomm/ICC '92*, 1992; pp. 1710–716.
Cvijan et al., "ISDN Computer–Aided Telephony", *IEEE Network Magazine*, Jan. 1991, pp. 46–53.

Primary Examiner—Alyssa H. Bowler
Assistant Examiner—Walter D. Davis, Jr.
Attorney, Agent, or Firm—Jeanine S. Ray-Yarletts

[57] ABSTRACT

A programmable workstation for collaborative working in a network comprises a conventional operating system and network control layer for controlling physical routing of data between nodes. A collaborative application subsystem which interfaces with application programs is responsive to a predetermined call from a collaboration call manager to establish the call manager at the node to handle incoming events which are not specific to any application program instances at the node.

8 Claims, 10 Drawing Sheets

5,539,886

CALL MANAGEMENT IN A COLLABORATIVE WORKING NETWORK

FIELD OF THE INVENTION

1. Description

This invention relates to call management in a collaborative working network and more specifically to a programmable workstation and a method for use in such a collaborative working environment.

2. Background of the Invention

Personal computers are now widespread throughout the business community and many are able to intercommunicate, either through fixed connections e.g. local area networks, or through dynamically established links e.g. ISDN or async lines over the public switched telephone network. Increasingly, these connected personal computers can be used to enhance collaborative working between remote individuals; a typical example being the use of desk top conferencing software. Successful collaborative work generally requires more than a simple data link between the participants; voice capabilities are normally essential and video links are frequently required. Thus remote collaborative working can often be regarded as an extension to the traditional telephone call—it being enhanced with the data and programs available at the desktop via the personal computer—and, on occasions, enriched with video services.

A broad spectrum of collaborative applications can be envisaged, ranging from utilities taking advantage of the data and applications on a workstation, e.g. sharing of screen windows and files, through to new collaborative applications designed to meet the needs of specific classes of remote user e.g. just-in-time education, remote presentations, executive broadcasts or help desk. The common requirements behind these examples are:

the support of a wide variety of personal computer platforms—both hardware and software.

operation over the existing communication networks.

group communications and multi-media data services.

The behaviour of a desk top conferencing system, particularly the way in which the system reacts to incoming calls, is usually determined by the suppliers of the system software. The conventional view of real-time desk top conferencing makes a distinction between the system functions, such as setting up and tearing down calls, and application functions, such as sending and receiving data. Thus while applications (such as a shared electronic chalkboard) may be aware of events such as the start and end of calls, they are unable to affect the way these events are handled in detail. For example, the barring of incoming calls is normally regarded as a system function which can be toggled on and off by time user and perhaps, via an API call, by an application program.

SUMMARY OF THE INVENTION

Accordingly, the invention provides a programmable workstation for collaborative working in a network of workstations forming tile nodes of the network, the network being connected by physical links for the transmission of data between nodes;

the workstation comprising an operating system;

a network control program layer, running on the operating system, for controlling physical routing of data between nodes; and a collaborative application subsystem for interfacing with application programs running on time workstation and responsive to a predetermined application program call from a collaboration call manager program to establish the collaboration call manager program at the node to handle incoming events which are not specific to any application program instance at time node.

The invention further provides a method of collaborative working in a network of programmable workstations forming the nodes of a network connected by physical links for the transmission of data between nodes, the method comprising in response to a predetermined application program call from a collaboration call manager program running on the workstation, establishing time collaboration call manager program at tile node to handle incoming events which are not specific to any application program instance at the node.

BRIEF DESCRIPTION OF THE DRAWINGS

The invention will now be described by way of example only with reference to FIGS. 1–17 of the accompanying drawings, in which.

DETAILED DESCRIPTION OF THE INVENTION

Figure 1:
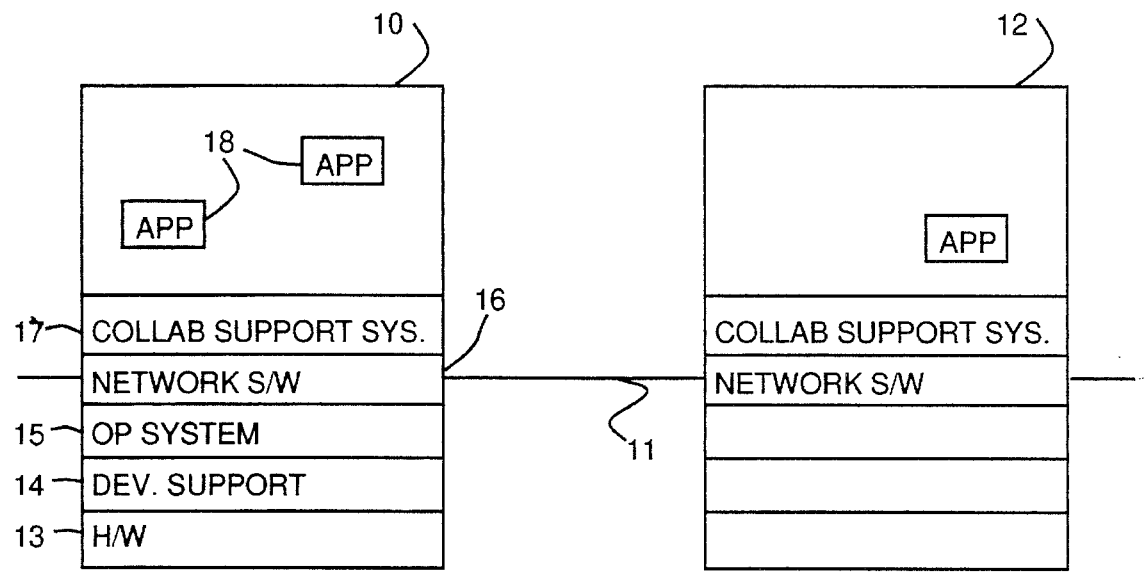
FIG. 1 shows two programmable workstations connected by a network.

In FIG. 1 are shown two programmable workstations 10 and 12 connected by link 11 in a network, such as a LAN or WAN. The principal components of the workstations are conventionally described as layers, starting with the hardware 13. The hardware which is not illustrated in detail, consists of a processor unit with main memory, secondary storage such as a disk file, a display unit and input/output devices such as keyboard and mouse. Device support software 14 enables the hardware devices to function within a known operating system 15, such as IBM's Operating System/2 (OS/2).

Also part of a conventional workstation, when used in a network, is networking software 16 for supporting connection to the network 11 and communication over the network between workstations. Typical networking software 16 could be the Netbios program product from IBM. Up to this point all that has been described is a conventional networking workstation capable of executing application programs 18.

In order to implement the present invention, each workstation also includes collaborative application support system software 17 which facilitates the development of application programs for creating a distributed collaborative working environment. In this environment, end-users of the workstation may communicate with users of other workstations in the network over multi-media channels and may work collaboratively on shared data and tasks.

Figure 2:
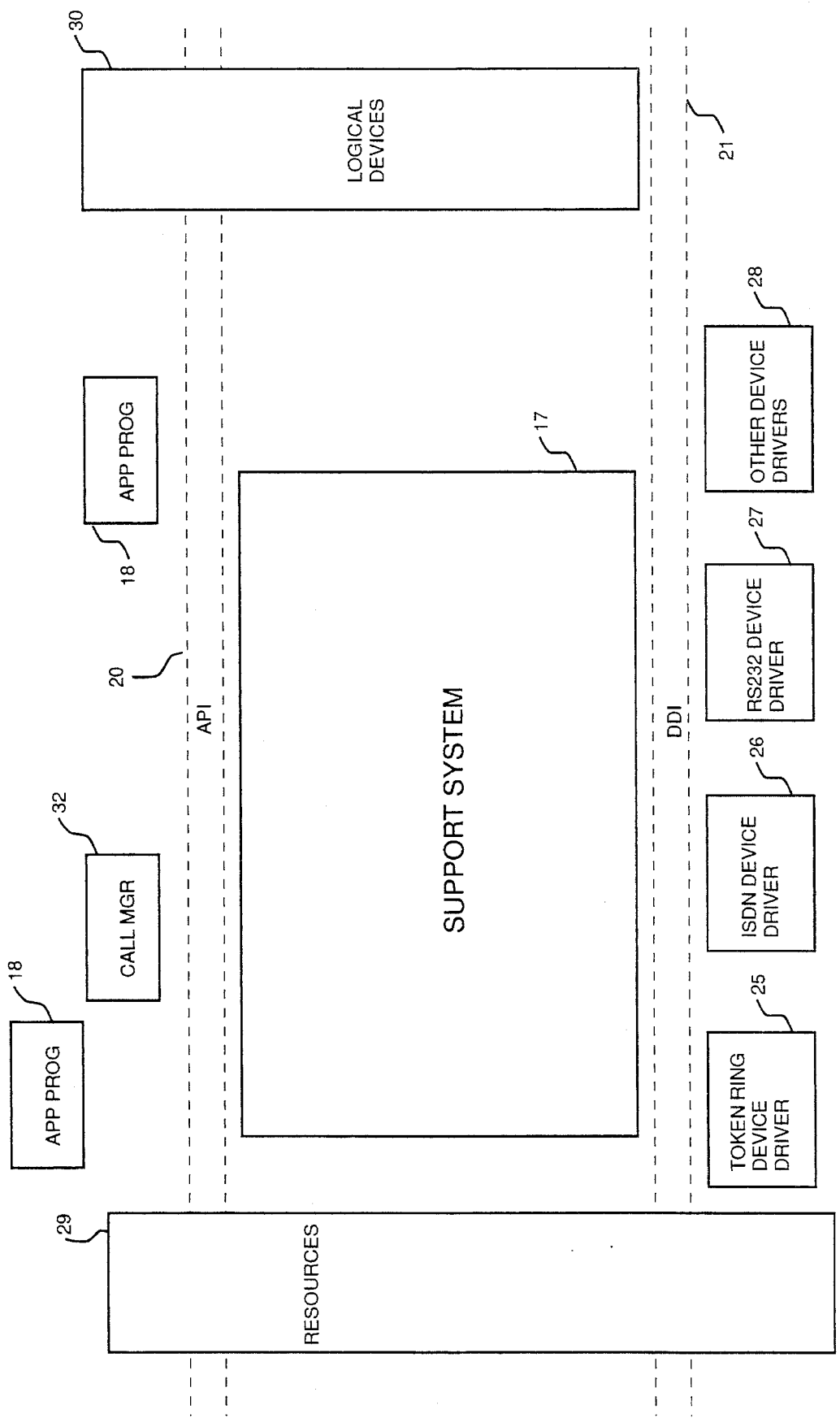
FIG. 2 illustrates the relationship between the support program shown in FIG. 1 and other software components on a workstation.
Figure 10:
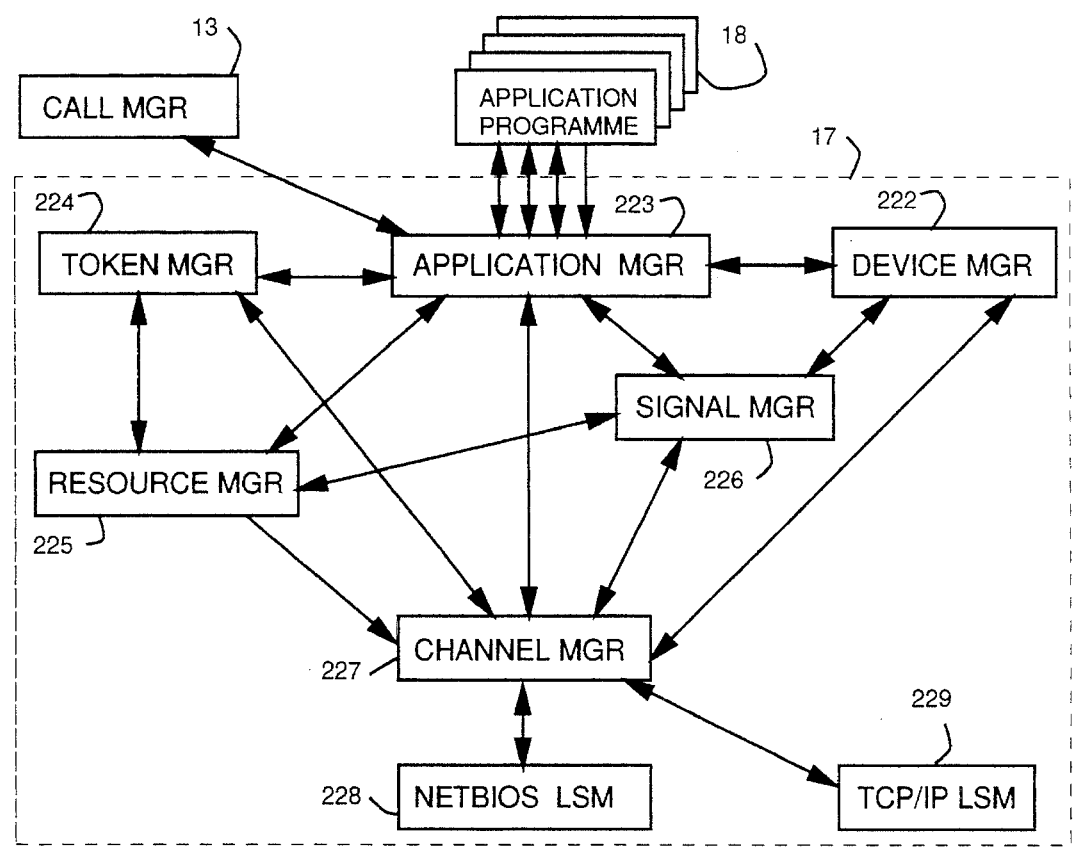
FIG. 10 illustrates the components of the support program.

The overall structure of support system 17 in relation to other software components of the workstation with which it interfaces directly is shown in FIG. 2. Further details of the internal structure of the support system are shown in FIG. 10. Broadly speaking, the main functional components of system 17 lie between two interfaces 20 and 21, illustrated by dashed lines.

An application programming interface 20 allows applications 18 to request support services. A device driver interface 21 allows the system to support an extensible range of software and hardware communications subsystems through device drivers such as token ring driver 25, ISDN driver 6, RS232 driver 27 and other device drivers 28. Link support modules 228, 229 interface with the device drivers. These are replaceable, (FIG. 10 shows only a possible selection) depending on the hardware options available at the workstation, and serve to isolate the support system from needing to know precisely which hardware is present. Through an implicit resources interface, (not illustrated) details of the communications, network, such as node addresses and directory data may be requested by both the support system, the applications and the device drivers from resource files 29.

The API 20 allows applications 18 to initiate peer applications and share resources, on a variety of hardware and soft:ware platforms, located on nodes across a diverse and complex communications networks. It allows them to define multiple dedicated logical data channels between shared applications, suitable to a broad range of multi-media traffic, independently of tile structure of the underlying physical network. It allows them to serialise, synchronise, merge or copy the data streaming between shared applications. It also allows them to support a range of attached devices and to allow the interception and redirection of the device data.

The support system includes other components to assist application development such as an extensible set of logical devices 30, interfacing to external applications and devices. Also provided is a set of end-user utilities, written to the API (not illustrated), which can also invoked from applications through a command interface.

Network, nodes and applications

At the highest level, the programming model presented by the API consists of a communicating set of nodes. A node is the addressable entity representing a user, and comprises an instance of tile support system software, and a set of resources such as application programs, data etc. Usually a node is typically a dedicated programmable workstation 10, capable of communicating with its peers; in a multi-user system a node is associated with each user.

Nodes are either supported nodes or non-supported nodes; a supported node is one where the support system software 17 is being executed. A collection of inter-communicating supported nodes is called a supported network.

Nodes are identified by name; ideally all node names should be unique but duplicates can be tolerated as long as their associated nodes are never required to inter-communicate. The choice of node naming scheme is not directly relevant to the present invention, although a hierarchical system such as that defined by the Internet protocol has many benefits. It is fundamental to the architecture that a node can dynamically join or leave the network.

Nodes can contain logical devices 30. A logical device is a software extension to the support system that allows an application to manipulate or manage software or equipment, in a manner consistent with other entities in the architecture. There is an extensive range of possible logical devices including: presentation windows, printers, disk drives, modems, and application programs.

Multiple applications can be executed at a node, subject to the constraints imposed there by the operating and windowing system. Applications are either aware or unaware; an aware application uses the services of the API; an unaware application does not. Both aware and unaware applications will generally be executing simultaneously at a node.

When the support system is fully active at a mode, one particular aware application must be running at that node. This application plays a unique role at that node and is known as call manager 32. Many call managers may be available for execution at a particular node but only one can execute at a time. The distinguishing feature of a call manager is that it responds to certain events generated by the support system; for example, it resolves any requests that are not directed specifically at an instance of an application, and optionally it may also handle resource management for the node. Call manager responsibility can be transferred from one call manager to another; also the role can be combined with user application function if that is appropriate.

The support software 17 may request that the resources of one node are made available for communication between two other nodes; this is termed passive operation and permission is controlled by the call manager at the passive node. As an example, consider two nodes A and B on a LAN, with a third node C connected to B by an asynchronous communications link. If applications at A and C wish to communicate, the traffic will need to be routed via B. The consent of the call manager at B is required for this use of its node.

Aware applications can share data and resources with other aware applications at the same or different nodes. A collection of applications sharing is called a sharing set. An aware application initiates a share request, naming an application sharing set, a target application and a destination node. This request is first passed by the support software to the call manager at the sending node, which will typically transfer it to the call manager at the destination node. Usually this second call manager will launch the requested application and the source application will be informed. The participation of the call managers in this process allows both local control of the sharing process and other actions to be initiated if necessary. The call managers play a vital role in resolving the names used by applications to idnetify other nodes and applications. The sharing mechanism can be cascaded; for example, if two applications are already sharing, one of them can initiate a share with a third application naming the same sharing set, with the result that all three applications are then sharing with each other.

Applications may also make local share requests on behalf of other applications thereby allowing membership control of the sharing set to be delegated. Facilities exist for either the issuer, or the target of the share request, to name the application sharing set. These names are not required to be unique: thus multiple sharing sets with the same name can exist.

Figure 3:
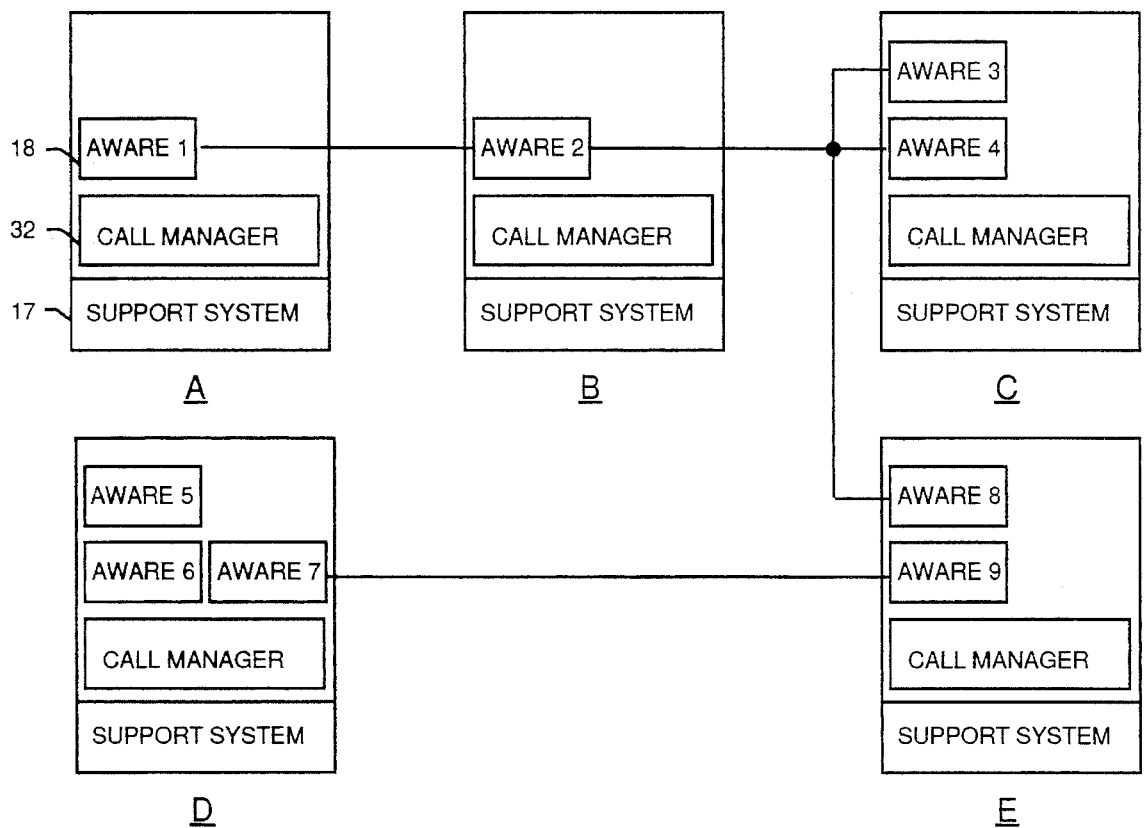
FIG. 3 illustrates applications being shared between nodes.
Figure 4:
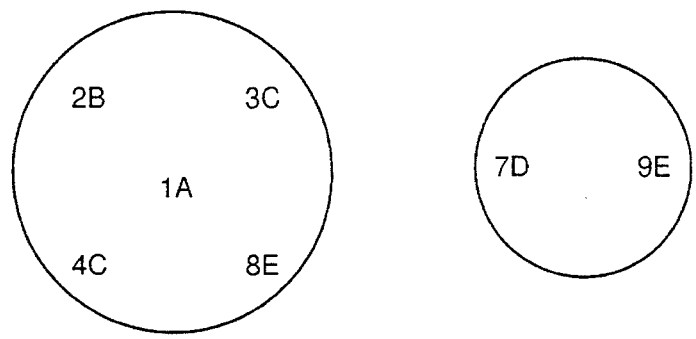
FIG. 4 shows the sharing sets resulting from the application sharing illustrated in FIG. 3.

Individual applications can cease sharing at any time, withdrawing from a sharing set; the other applications in the set are informed of the withdrawal. FIG. 3 shows a number of applications A–E sharing. This results in two sharing sets, irrespective of the order in which the shares were requested, as illustrated in FIG. 4.

Communications, channels and ports

Figure 5:
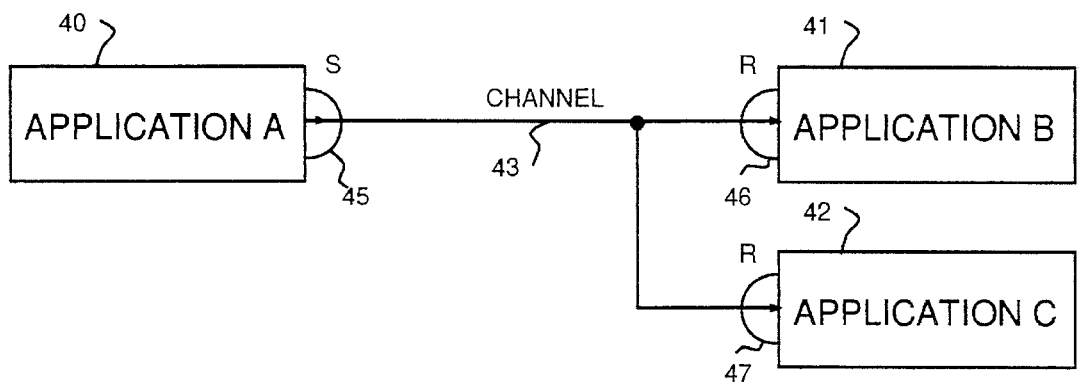
FIG. 5 shows applications linked by a data communication link or channel.

As illustrated in the schematic example of FIG. 5, applications in a sharing set such as 40, 41 and 42 can establish data communication links with each other known as channels. Channels such as 43 and 44 are logically dedicated and uni-directional pipes, with application specified transmission characteristics. A channel is always defined by the sending application and it goes from a sending application to a receiving application. The ends of channels are known as ports; thus all channels have one sending port and one receiving port. A sending port such as 45 sends data packets down the channel; a receiving port such as 46 receives data packets from the channel in the order in which they were sent. There may be no direct mapping between the logical channel structure seen by the aware applications and the physical communication network in existence between the nodes.

An application may establish multiple channels to another application as a convenient way to separate data traffic of different types. The system network manager 31, FIG. 2 may map some or all of the logical channels on to a single physical link such as link 11, FIG. 1 but this will be invisible to the application.

Channels have a number of quality of service characteristics, initially negotiated with the support system 17 during the creation process, which allow data transmission characteristics to be tailored to tile requirements of the expected traffic. These characteristics include encryption, compression hints. Encryption allows time data to be encrypted during transmission along tile channel; compression hints allow the system the option of compressing the data over narrow bandwidth links.

Quality of service parameters are defined according to signal type, which distinguishes analog from digital data. They need not be specified explicitly, but can be notified to the support system in terms of data classes. This mechanism allows video channels, voice channels and other data channels to be sensibly established. Channel characteristics can be re-negotiated after channel creation. The data transmission characteristics are implemented in the real network by means of time data transformation manager 32, FIG. 2 in response to the characteristics specified in the channel creation calls over the API.

Four types of channel are supported: standard, merged, synchronous and serialised. Standard channels are the default case; the other types are used in conjunction with collections of channels, known as channel sets. Through a merged channel set data packets are combined from multiple channels and delivered to each receiving application through a single port. There is no guarantee that each application receives all the data packets in the same sequence, only that each application receives all the packets. Through a serialising channel set data packets are combined from different channels, serialised, and delivered to each application such that each receiving port receives the same sequence of data. Through a synchronising channel set data is synchronised, so that the data packets on separate channels are tied together in time (for example voice with video), but delivered through the individual ports belonging to the channels.

Figure 6:
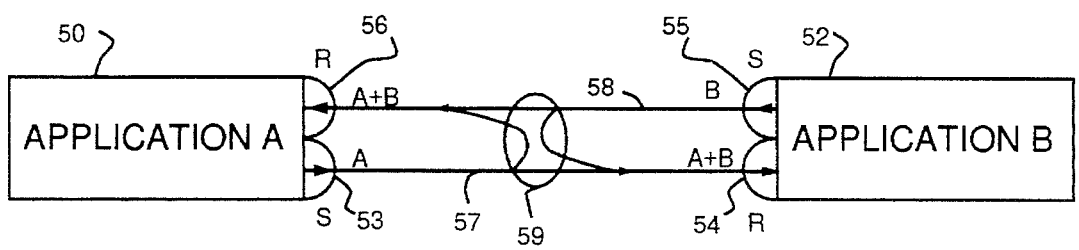
FIG. 6 shows applications linked by channels to provide serialization in a shared drawing board.

An example of data serialisation is illustrated by a shared drawing board application illustrated in FIG. 6. Two identical applications, A and B (50 and 52), allow their users to draw on a single shared surface. In order that the users at A and B see identical results, all the drawing orders at A must be sent to B via ports 53 and 54, and vice versa via ports 55 and 56, in such a way that the sequence processed at A and B is identical. This is accomplished by each transmitting their own data both to each other and to themselves, over two channels 57 and 58 which are members of a common serialising channel set 59.

Figure 7:
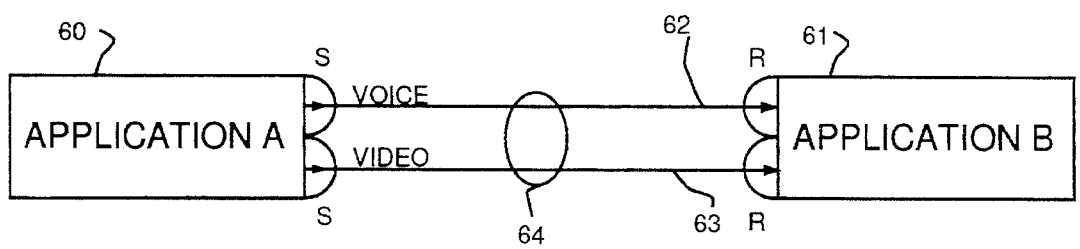
FIG. 7 shows the use of a synchronizing channel to provide data synchronization.

With reference to FIG. 7, data synchronisation is illustrated by an application A (60), that needs to send lip-synchronised video and voice to application B (61). Two channels 62 and 63 are used for the transmission, each being a member of the same synchronising channel set 64.

Channels can be explicitly created by an API call to the support system, specifying the required channel characteristics, and new channels can also be added to an existing port. The latter mechanism allows a port to be shared across channels belonging to different channel sets; for example data can be sent from a single port to one set of destinations belonging to a merged channel set, and to a second set of destinations belonging to a serialised channel set. Digital channels and analog channels cannot be members of the same channel set. A channel can be deleted, the channel being uniquely identified by specifying its sending and receiving ports.

Channels can be implicitly created as a consequence of an application being, or becoming, a member of an application sharing set. For example, if unshared applications already have a merged or serialized channel, and the channel set name iused is identical across these applications, then when the applications share with each other, the additional channels required will be created automatically. Applications are notified of channels implicitly created in this way.

Ports have an assigned connect type: event, command or null. Event ports generate an event when data is either available or is required; command ports allow the application to drive the receipt or supply of data to the port. Null ports are reserved for ports that are unable to supply data to an application e.g. ports associated with analogue channels, such as the sending port of a video camera. Ports can be controlled through "signal_port" commands sent to their port event handler. These can be issued to the local port and can be passed to any other port in the channel. Normally, the singal commands for channel ports will be sent to the port event handler of the application either supplying or receiving data, and may be used for example to stop, start, decrease or increase the data flow. The order of signals between a source and target is maintained. Signals sent to receiving ports in a serialising channel set are serialised themselves, so that all sources receive the same sequence of commands.

Other typical signals are "rewind" or "pause" to a tape drive, or "change paper size" to a printer device.

User exits can be optionally associated with ports. This allows monitoring or manipulation of the data, after it has been supplied to a sending port, or before being presented by a receiving port. In the case of synchronised channels, synchronisation is performed from after the data leaves the sending port user exit, and up to the data being presented to the receiving port user exit.

Figure 8:
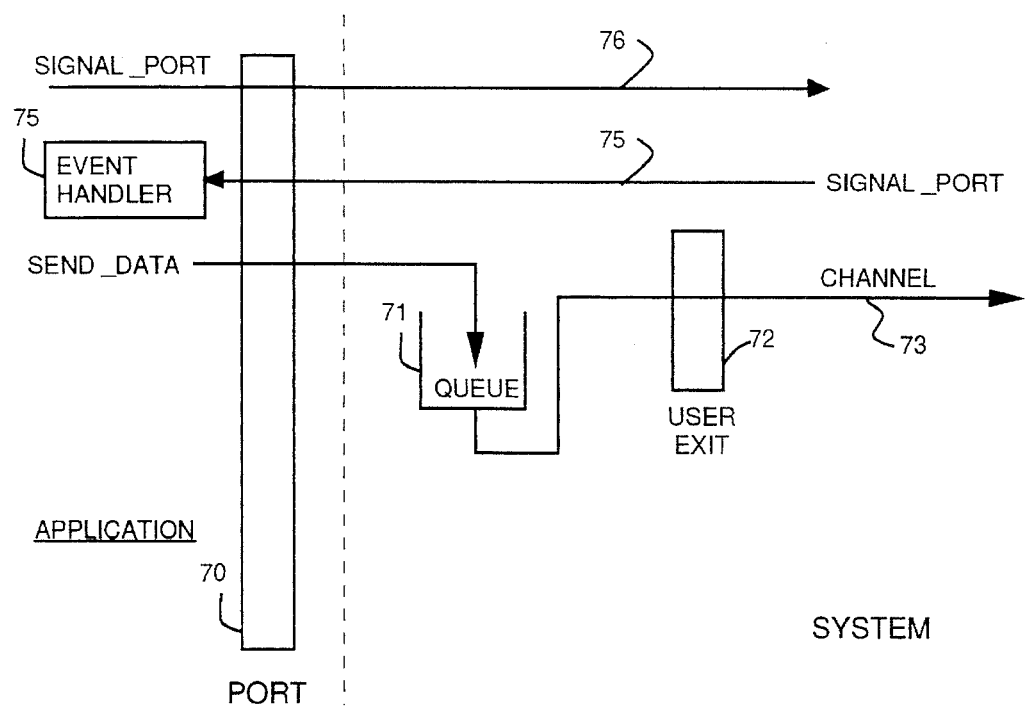
FIG. 8 shows the structure of a sending port at one end of a channel.

The overall structure of a standard sending command port is shown in FIG. 8. In response to a "send_data" command from an application, data is queued in a buffer 71 of port 70. The application empties the buffer to send data asynchronously over a channel 73 via a user exit 72. Incoming "signal_port" commands are received by the port event handler 74, independently of channel 73 on line 75 and can be retransmitted outwardly on line 76.

Receiving ports are effectively the mirror image of the corresponding *sending port. For a standard receiving event port the structure is similar, but in this case the event handler processes both the data and the port commands.

The situation is more complex when synchronisation is involved. In this case a standard receiving buffered port must be modified by the inclusion of the synchronisation process on the incoming channel prior to the user exit and the buffer.

Figure 9:
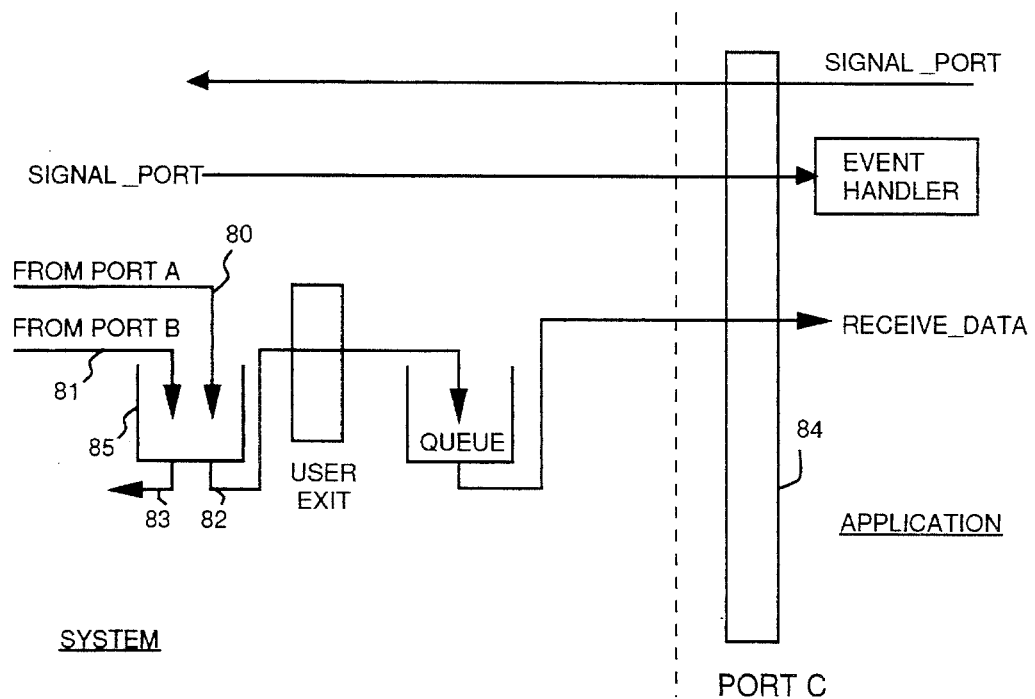
FIG. 9 shows the use of receiving ports to provide serialization.

Serialisation logically involves the collection of all events in a central point, followed by the broadcast of each event to all the destinations for that event. Diagrammatically, this is represented by FIG. 9 for the case of two ports A and B on channels 80 and 81, serialising their output at 82 and 83 to port C (84) and another port (not shown) in serialising process 85. Serialisation can be implemented at a single central point with all data being sent there for serialisation and subsequent distribution; alternatively the serialisation process itself can be distributed.

A receiving port can cause the sending port to stop sending data down the channel, with the option to either discard or deliver the remaining data in the channel. Suspended data transmission can be resumed subsequently.

An alternative method of application inter-communication, avoiding the use of channels and ports, is provided through a "signal" command which allows control information to be sent between applications.

Ports are associated with a data class which specifies data type and data sub-type. The data type identifies the nature of the data, e.g. voice, video, file etc. and also distinguishes analogue from digital data. The data types are further subdivided according to the precise format of the data; thus examples of voice sub-types are G.711, G.721, G.722.

The data class may be queried by an application to obtain the data format, independently of the data stream itself, without relying on other applications. Additionally, the data type may be different at the sending and receiving ports, with Lakes performing the conversions below the API.

Certain characteristics of ports and channels can be changed after they have been initially established; for example, quality of service, data class and compression hints. This provides the flexibility for an application to modify its communications usage during execution; an example being the temporary degradation of video quality to improve file exchange performance.

Ports can be connected together to establish extended communication links, so that an application may route its inputs through to another application for processing. When ports are connected in this way, and providing user exits have not been established, no further application involvement is required after the routing has been established. This allows the streaming of data between applications and devices. Connection is permitted between channels in different channel sets, of different types, having different quality of service characteristics, of different data class or different connect types (unless one of the ports is null), provided only that one port is sending and one port is receiving. Connected ports can also be welded, so that the connection is permanent and persists even when the local application has terminated. The channel behaves in all respects as though it had been originally created from its source directly to its destination. Any user exits which may be present are removed.

Logical Devices

Logical Devices 30 (FIG. 2) are supported by the support system to enable (i) easier access to system resource and devices, such as clipboard, DDE, printer and video devices, (ii) unaware applications to be used for collaborative working, for example by giving access to the window contents and file activity of an unaware application, and (iii) end to end data streaming without application involvement. Frequently used devices include: video capture, video playback, audio playback etc. and facilities are provided for additional devices to be defined.

Logical devices are identified by type; the type names are local to a node. When opened, they present a port to the application; a single logical device can have multiple ports, moreover a device can simultaneously present ports to different applications at the same node. The relevant API call to open a port allows characteristics to be established, peculiar to that device, for example the data formats to be used. Opened logical devices can be controlled through commands sent to the signal port, the commands being specific to the particualr logical device. Typical commands to a device port are rewind or pause to a tape drive. The device status, for example whether data is available, can also be queried.

Devices are exactly like channel ports, except that no user exit is present. Applications can connect ports on logical devices to a channel port; this enable data to flow to or from the device and across the channel. This data flow does not require further application involvement once the connection has been made. For example, data can be streamed from a camera through a camera logical device, across a channel, and displayed by a window logical device. The application can control the two logical devices via there signal ports; when the transmission is no longer required, the application can disconnect the ports, close the devices and remove the channel.

Device ports cannot be welded to channel ports, since this would allow a device to exist outside the control of a local application. Logical devices are permitted to issue API calls to the support system, and in this regard act on behalf of the owning application (ie the application which opened the device). Devices for example can cause their owning application to share with other applications, create channels, and send or receive data.

Potential devices include:

| | |
|---|---|
| system clipboard | LPTx |
| DDE | window |
| shared clipboard | printer |
| serial emulator | file |
| video | codec |
| audio | telephone |

Shared use of the clipboard is facilitated by the system clipboard and the shared clipboard devices. The system clipboard device may be opened by an application to provide a sending and a receiving port, giving access to the windowing system clipboard data at that node. Only one sending port may exist at any time, but any application at that node may open receiving ports. Through the use of channels, system clipboard data from one node, can be simply routed across to other members of an application sharing set.

Another device, the shared clipboard, is provided to ease data sharing. It is unique to a sharing set; only one sending port is allowed but multiple receiving ports are supported. Apart from these distinctions, it behaves in a similar manner to the system clipboard and provides a simple mechanism for applications to share common data.

The window device, allows a window, defined on the screen, to be associated with a sending or a receiving port (or in some circumstances both). The sending port can be connected to a channel port and data can be streamed to the window and displayed. A variety of data formats are supported.

The DDE device can be opened to provide sending and receiving ports which are coupled to the dynamic data exchange mechanism. Through this device an aware application can control an application that supports DDE, or be itself controlled. Moreover, by establishing the appropriate channels, two remote DDE applications can be linked together.

The printer device, allows data to be sent to the system printer; only a single sending port is permitted.

The asynchronous serial device supports one sending port and multiple receiving ports and interfaces to RS232, RS422 and other serial communications.

A number of video and audio devices exist including: the video display and playback devices (supporting IBM/Intel ActionMedia II Adapter/A); the video capture device (supporting IBM M-Video Capture Adapter/A); the audio capture and playback devices (supporting IBM M-Audio Capture and Playback Adapter/A); and other specialised audio/video devices (such as H320 compliant codecs).

A number of aware applications are shipped as system utilities, and take advantage of these devices to offer general purpose end user functions, for collaborative working over a network.

Customisation

Customisation information for the support: system 17 is stored in an appropriate platform-designated repository; for Windows and OS/2 these are the files called LAKES.INI and LAKESQOS.INI, formatted as a standard ASCII file, containing sections headed by an identifier, where keywords and their values are kept. Applications may also have their own additional initialisation filed. LAKES.INI contains standard section including information on configuration and start-up options, aware applications, devices and physical communications link; additionally application sections containing data specific to those applications may be present. LAKEQOS.INI contains quality of service information relating to physical links and data classes. Calls to access and update these files are provided in the API.

Resource Management

Collaborative working frequently requires that resources owned by a node, for example a printer device, can be shared with other nodes. Such resources are considered to be global resources and access is controlled through global tokens. Other resources are local to application sharing set, for example a shared pointer, and access to these is managed through application tokens.

A token owner determines the significance of a token and allocates it on request. At the discretion of the owner, queued requests may be permitted, and more than one concurrent holder of a particular token may be allowed. Token owners can optionally force holders to hand back tokens.

Global tokens share a common name space throughout the network, but since applications are expected to know the location of a globally available resource that they require, duplicate global token names are permitted. Facilities for the broadcasting of availability information are not provided; Instead, the call manager at the node with the global resource is responsible for resource management and therefore holds any global tokens. Global tokens may be held by an application instance on an exclusive or shared basis; token ownership, however, cannot be transferred to an application. Requests for a global token may be queued, with the queue being held above the API and managed by the node call manager. Access to global tokens is not restricted to a sharing application set.

Application token name space is restricted to the application sharing set. Tokens may be owned by any member application and ownership can be transferred. Application tokens may be held on an exclusive or shared basis and requests for tokens queued, with the queue being held above the API, and managed by the current application token owner.

Initialisation and Termination

The support system is started by running a LAKES.EXE file, which reads the profile data from the file LAKES.INI. The named call manager is started by the support system, which then registers itself as an aware application. A "set_call_manager" command then establishes this particular application as the call manager for that node. After this command, the support system is fully active at that node and is able to process incoming events and requests.

Aware applications can be initiated, either by the usual operating system procedures, such as a double click on an icon, or by a "launch" command. In the former case, the application will register with the support system, and in the return data receive its application and node handles. The call manager is notified of this registration, and supplied a handle to the application. In the latter case, the launching application is returned a handle to the application; this is only valid in very restricted circumstances until the launched application has registered with the support system. The return data provides the launched application with its application and node handles. Both the call manager and the application that specified the launch (if different) are notified accordingly.

Applications may revert to unaware application status by de-registering, the call manager being notified. All tokens held are released and the token owners are notified; all tokens owned become invalid. If the application is a member of an application sharing set it is removed and the other members notified of its departure. All ports created by the application are destroyed and the other applications owning ports to the affected channels are notified. All channels connected by the terminating application are welded and appropriate events raised at the end channel ports. Appropriate events are raised is necessary to the local call manager, plus the call managers of any nodes supporting a welded channel on behalf of the deregistering application. All open logical devices are closed; if any of the logical devices are connected to ports, destroyed as part of the de-registration process, then the whole connected channel is destroyed and the appropriate events raised.

A shutdown request can be issued by an application to close down the support system at a node in an orderly manner. This raises an event in the local call manager, and if the call manager accepts the request, corresponding shutdown events are raised at the other' applications. These then prepare to close down and de-register, each de-registration being notified to the call manager. After the call manager has been notified that all the applications have de-registered, it too de-registers, to complete the shutdown.

The normal operation of the support system depends on the presence of the call manager. It is possible to replace the existing call manager with another, but the existing call manager may reject the request to do so.

Applications may join other applications in a sharing set by issuing the "share_app" request and naming an application sharing set; the normal case being where the target application and node are both specified by name. If an application at one node wants to share, by name, with an already existing instance of an application at another node, then the procedure is as follows. App 1 at node 1 issues the "share_app" request, specifying its own applciation and node handles as tile source, and the names of app 2 and node 2 as the target. After verification with tile call manager at node 1, an appropriate request is sent by the support system to the call manager at node 2. Providing this call manager accepts the request, this is then passed onto app 2, which can return a confirmation, assuming that it wishes to accept the share. This scheme provides for considerable flexibility in application sharing. Each call manager is aware of the share activity at its node, whether applications are the source or target of "share_app" requests.

A call manager has the following options on receipt of a share request: (i) handle the share itself (ii) transfer the share request (iii) reject the share (iv) launch a new application to handle the share (v) change the application and node name.

An application is not a member of an application sharing set when launched. When the source application issues a "share_app" request it has the option of naming the resulting sharing set; if it does not name the sharing set then the target must supply the name. After the share, both the target and the source join a new sharing set with this name. If either the source and/or the target were already members of a sharing set with this same name, then those sharing sets are merged with the newly created sharing set. Applications can leave a sharing set using the "unshare_app" request.

Data transmission and receipt

There are four mechanisms for applications to exchange data:

(i) User information strings
  This is effectively a string passed to the support system as a parameter in an API call, which is then passed to the target application.
(ii) Signal function calls
  These commands allow control information to be sent between applications, and are not restricted to those applications within a single application sharing set. Depending on the API call used, a reply will or will not be provided. Note that since this method uses the communications paths established between support systems on different nodes for their own data control flows, this technique is restricted to light data traffic.
(iii) Channel transmission
  Channels are intended to support the transfer of volume data between applications. They provide the only means of controlling the transport characteristics. The use of channels is restricted to applications within the same application sharing set. When requesting the creation of a channel, the following information is specified: target application handle, channel set type and identifier, data class, maximum buffer size, user exit, node handle, quality of service, connect type, port event handler, user information. An alternative approach to channel creation is to take advantage of the channels created when applications with existing merged or serialised channel set are involved in application sharing.

Data is sent over channels by applications in packets; at the physical level the unit of data transmission is a frame. Certain data is spoilable, ie under certain conditions, if it cannot be delivered in time to meet the quality of service requirements, then it may be discarded. Some packets can be marked as spoilable, other packets as spoilers. A spoiler packet, if present, will cause the removal of those spoilable packets with which it has been associated. This technique supports for example the implementation of buffer management schemes for video, where certain pacekts are delta frame packets, and others are full frame packets. Selected sequences of delta frame packets can and must be deleted if a full frame is available.
(iv) logical devices
  In certain specialised situations it is appropriate to use logical devices to exchange data. A single logical device can present ports to multiple applications; the logical device can then move data between the ports. This transport mechanism is not restricted to applications within the same sharing set and therefore overcomes a limitation placed on channels; however logical devices cannot span across nodes. Moreover any necessary quality of service support must be explicitly provided for by the particular logical device.

Negotiation of Quality of Service

Applications lave different needs for quality of sevice and bandwidth negotiation and control. For examples, the following may be required:

pre-determined and constant quality of service, eg G.711 voice flexible requirements at channel creation, but constant thereafter, eg file transfer single application management of channel resources, eg an application communicating multiple data types such as video, voice, and data under restricted bandwidth conditions i.e. the video quality must be degraded intermittently to allow data traffic cross application management of channel resource, eg a group of applications communicating multiple data types under restricted bandwidth conditions and coordinating their activities as the priorities change for different types of data traffic Certain applications have fixed quality of set-vice requirements for the channels needed to communicate with other applications. In these cases the channels may be established directly, using a "create_channel" request. Parameters on this request identify the receiving application(s) and both the channel and the sending port characteristics. If the resources are available, and the receiving applications accept the request, then the channel will be created.

Some applications are more flexible in their quality of service requirements and need to determine what is available to a particular node and then use this information in setting the parameters of the "create_channel" request. This is accomplished through a "query_resource" command, specifying the target node. The subsequent "create_channel" can request an equal or lower quality of service and expect the request to be satisfied, if there is not competition for the communications resource.

Other applications have flexible quality of service requirements, but need to compromise the specification over a number of channels. This requires the application to reserve resources and then allocate from this reserved pool.

This is achieved by means of a "claim_resource" command specifying a resource set identifier, a quality of service, and the target node. This has the effect of reserving that resource and associating it with the specified identifier. This identifier can then be specified in a subsequent "create_channel" command, in which case the resources are allocated from those reserves. The "query_resource" command can be used to determine remaining resources in a resource set.

Certain applications need to dynamically change their channel characteristics during execution; for example, available bandwidth must be re-allocated across channels. This can be done through a "change_channel" request, specifying a resource set identifier. The resources are given to, or taken from, those resources associated with that identifier. This technique allows, for example, a fixed resource to be secured for an application to application communication, and then re-allocated dynamically according to the traffic e.g. video bandwidth can be temporarily reduced to allow faster file transfer.

Resource set identifiers are local to an application instance and contain resources appropriate to one particular quality of service.

Networks

An application can specify quality of service characteristics when creating a channel or when reserving resource for later allocation to channels. Channels are mapped onto physical links; the data pacekts sent by applications over logical channels being implemented as data frames sent over links.

Links are characterised by order, whether switched or fixed, their time-out parameters and by their quality of service characteristics. Order determines the order in which the support system will attempt to use the links for data transmission, assuming that there is a choice of links available with suitable data transmission characteristics. Order, switched or fixed link, and time-out parameters are specified in the initialisation files.

Link descriptions, optionally including quality of service characteristics, are stored in a link data base external to the support system. Defaults for the quality of service information are contained in the initialisation files. The data base is accessed by an installation supplied executable, which is called by the support program. The quality of service parameters relevant to digital links are: throughput, latency, jitter, frame size, frame error rate, frame re-transmission time, compression hints, encryption.

The key parameters used to characterise the quality of service required by applications over logical channels are: throgput, latency, jitter, packet size, packert error rate, encryption, compression hints, priority. Most of these mirror their link counterparts with the exception of channel priority, which specifies the order in which the support system will attempt to service data tranmissions over all the channels at that node, assuming that there is resource contention between the channels, and packet error rate, which specifies an acceptable random proportion of packets that need not be delivered due to loss or error in transmission (there is no guaranteee that the support system will conform to such a limitation; specifying zero here results in the application being notified of any failures).

The above information is used to determine what links to use for application to application communication. A data base containing information such as type of link and service characteristics can be accessed via the resources interface, whilst the channel information is obtained from the application. The support system then selects an appropriate link to use based upon matching the fully resolved channel requirements with the fully resolved available links information, taking account of (a) the need to exchange control information between the support systems at different nodes, and (b) the order values associated with the links.

Both software and hardware compression and encryption are supported. Hardware features on a physical link are accommodated by considering the various combination of options as different available links types, each associated with particular transport characteristics. Software routines can also be used, but these will not be invoked if specific latency and jitter requirements have been set.

In order that the complex process of route selection can be performed outside the support system if necessary, the RLI calls used to retrieve link information also supply all the required channel quality of service characteristics. Through this mechanism, an external routine can itself determine the appropriate route and return that route to the support system. An example of the need for this might be that transmission costs vary with the time of day.

When applications with channels share with each other, if their existing channels belong to the same named merged or serialized channel set, the support systems create additional channels. An attempt is made to establish these new channels from each sending port, with a quality of service appropriate to that port, ie an implicitly created channel will attempt to have characteristics such that it can transport satisfactorily any data packets expected to be sent down any one of the pre-existing channels from that port. In some cases, due to restrictions imposed by the capabilities of the available physical links, it will not be possible to create channels with such characteristics. However, in all cases a channel will be created, and it is the responsibility of the application program to query the channel capabilities, if these are likely to be significant.

A channel between nodes may be realised over a single physical link, or over multiple, serially connected links. The physical connection existing between two nodes is termed a route.

a) Permanent Digital Networks

The support system operates with either dedicated of shared, switched or permanent, digital links between nodes. Shared links have unpredictable latency and bandwidth characteristics, unless bandwidth management facilities are being employed. Such features give permanent links many of the characteristics of switched connections.

b) Permanent Analogue Networks

The support system supports analogue communications in a very similar way to digital communications, in those situations where:
analogue links exist between nodes.
connectivity and routing at each node can be controlled by the system at that node.
a digital control channel exists between the nodes.

Analogue channels are logically dedicated uni-directional communication links established by the sending application, and they may terminate in more than one receiving application. They may be distinguished from digital channels by their quality of service characteristics. Ports terminating these analogue channels have a null connect type since they cannot supply or receive data from applications. Only standard or merged channels may be established; serialsing and synchronising channel sets are not permitted.

Logical devices can present analogue ports when opened; thus a video player device can be used as a source of analogue video and may be connected to an analogue channel through an API command. The direct connection of analogue and digital channels is not permitted; however certain devices e.g. a codec device provide both analogue and digital ports when opened and can be used to effect such a coupling.

c) Switched Digital Networks

Switched digital networks can be used by the support system for inter-node communication without exposing the switched nature of the connection. Information accessed via the resources interface is used by the system to decide when to terminate an inactive switched connection.

Equipment, such as digital telephones, attached to a switched network, are accessed by applications in one of two ways. If a simple connection is all that is required then the telephone may be regarded as a virtual phone application executing at a virtual node. The connection to the phone is initiated by a share request specifying the virtual phone as the target, resulting in a telephone call established between a telephone associated with the local node and a remote telephone. Incoming telephone calls can be handled in the same way, ie as a share request.

Alternatively, the phone may be accessed as a logical device. Thus an ISDN phone device may be opened to present receiving and sending ports, with an associated event or command connect type: dialling, and other control functions, are implemented through "signal port" commands. Third party connection between digital telephone equipment is similarly affected through commands to an appropriate device; this may be physically implemented through commands to the local switch.

Potentially active multi-point control units, which dynamically modify data or routing, for example, an MCU implementing the CCITT recommendations for audio-visual communication, may also appear as devices to applications.

d) Switched Analogue Networks

Analogue telephones and other equipment, attached to the public switched network, may be accessed in a similar manner to digital telephones, ec either as a virtual phone application executing at a virtual node, or through a logical device. A PSTN telephone logical device can be opened to present a port, with a null connect type i.e. it cannot supply or receive data from an application. "Signal_port" commands are used to control the device. First party connection can be implemented through a modem injecting dialling tones into the local line; third party connection, and multi-way calls through commands to the local switch.

Interfacing to Unaware Applications

The support system provides facilities which permit unaware applications to be used for collaborative working. An aware application supplies the user interface dialogue and interacts with the particular unaware application via virtual devices. This same aware application then communicates with a related aware application at the remote node to pass the information to the remote user. Several such applications are included as general purpose utilities.

Figure 11:
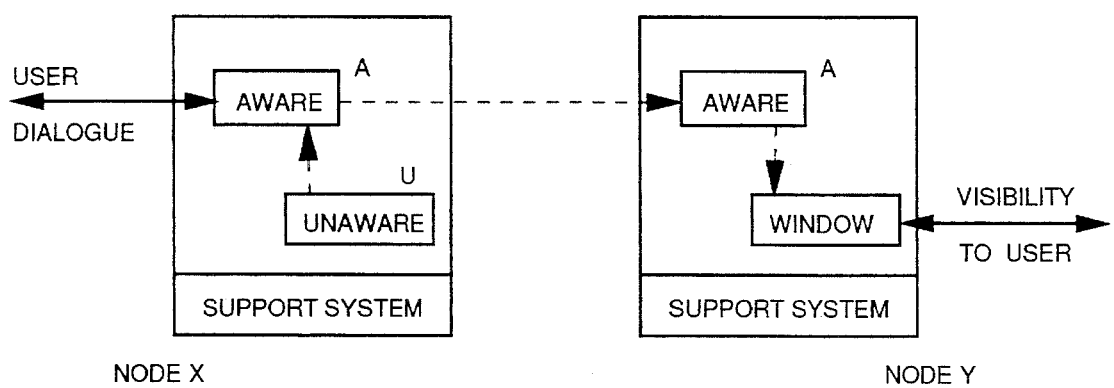
FIG. 11 shows how an application window at one node may be displayed at a remote node.

A common requirement is for an application window of an unaware application to be displayed at a remote node as illustrated in FIG. 11. The implementation is as follows: an aware application $A_X$ at node X dialogues with the user to identify the window required, assumed here to be the unaware application $U_X$. $A_X$ then opens a window display logical device, with the appropriate parameters, the effect of which is to generate a port through which copies of the window data are made available. $A_X$ connects this to a port on a channel leading to an aware application $A_Y$ at the destination node Y. $A_Y$ then opens a real window logical device, and connects the port created to the receiving channel port. Data flows between the nodes, and is displayed at Y, without the further intervention of either application $A_X$ or $A_Y$. Options available on the windows logical device open request allow the application to specify such parameters as bits/pixel, frequency of update and data format (e.g. text, bit map and option of included pointer position).

Remote pointers over the shared window of the unaware application $U_X$ can be handled by $A_X$ and $A_Y$ setting up a channel suitable for the interactive data class. The real pointer on each node is then used for identifying features in the shared window; this can be achieved with an algorithm such as: each user wishing to point moves his pointer into the shared window; when pointers are in the shared window their co-ordinates are transmitted to the sharing applications. The combined co-ordinates are then used to control the pointers; the effect is that whoever moves the cursor last, positions all the linked pointers.

Remote printing and remote file generating are similarly accomplished through logical devices. In the case of printing, a printer emulator device is installed at the source node. When it is selected as the printer device by the user, the effect is to redirect the printer data stream to a port. This is then connected, via the aware applications, to a real printer device at the destination node. This general technique is extended for a range of other capabilities such as dynamic data exchange (DDE) and the system clipboard.

Remote control of an application or system is not supported directly; however an application to perform remote control can be implemented above the API, with Lakes providing the group communication and multi-media data transmission facilities.

Programming Considerations a) Program Call Types and Structure

Figure 12:
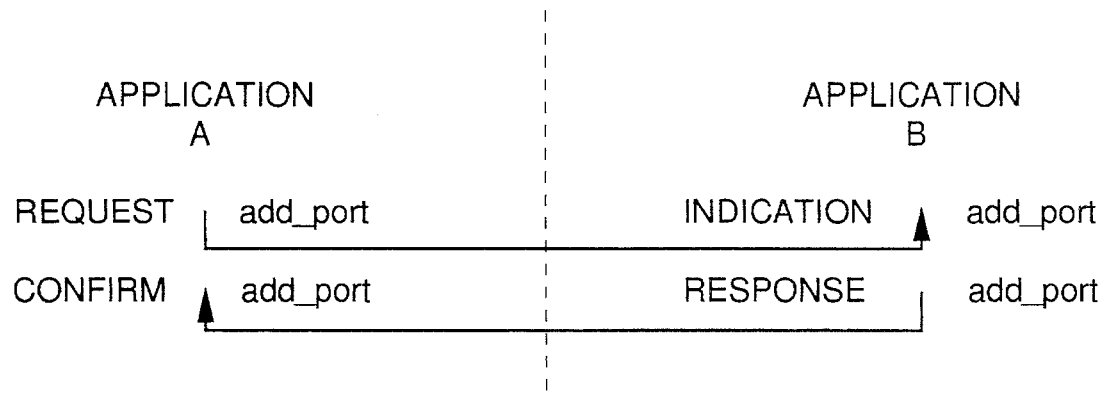
FIG. 12 illustrates the sequence of events resulting from a call to the support structure.

Program calls to the API generally result in a request, indication, response, confirm sequence. An application A, requiring a service, requests that service, supplying the appropriate parameters. The request usually requires another application B being made aware of that request; the mechanism for this is an unsolicited event which appears as an indication at the application B. The action taken by B to the indication event is given to the support system as a response, with appropriate data. The system passes the information back to application A as a confirm event. This is illustrated in FIG. 12 using the example of the sequence involved in adding a port to a channel (for simplicity no parameters are shown).

An API call may be either synchronous or asynchronous, depending upon the particular function; a synchronous call returns control when the request is complete, an asynchronous call returns control immediately. To help applications monitor the progress of an asynchronous call, these calls contain a reference identifier. This identifier is valid until the request has been satisfied and queries can be issued to obtain status; this same identifier can also be used to cancel a pending request. All calls pass back a return code denoting call status.

b) Addressability

An application requests addressability to nodes by using the node name. This name is first passed to the locak call manager which has the option to modify it. The resultant name is then used by the support system to determine connectivity information, this requires access to the externally held network and user data base, using the resources interface. Thus the support system determines physical addressability for that name through queries to the network configuration via the resources interface 29, FIG. 2. A node handle is returned to the application to reflect this resolution of the node name. Addressability from one application to another application requires the resolution of an application name. If both applications are at the same node, the local call manager can perform this resolution, else both call managers must be involved. This resolution results in the target application being identified to the source application by an application handle. Calls using application names are always passed to the call manager for resolution; calls using application handles go direct to the specified application.

When an application creates a channel, addressability to the channel port is provided through the system returning a port handle. Similarly the opening of a logical device results in a device port handle.

All handles are guaranteed to be unique to the using application but are not valid if passed to other applications or nodes.

c) Event Classes and Event Handlers

API requests are provided to assist with event and call control. A "begin_monitor" request allows an application to monitor requests and events at a node, the scope of the monitoring being controlled by the choice of monitor class from one of the following:
All: all events or API calls
Application Signalling: signal events/API calls
Call_manager: call manager events/API calls.
Data: data transmission events/API calls.
Device: device events/API calls.
Monitor: monitor events/API calls.
Port: port and channel events/API calls.
Profile: profile events/API calls.
Share: share and unshare events/API calls.
Synchronisation: synchronisation events/API calls.
Token: token events/API calls.

The scope of the monitoring is controlled at the event or API class level. Events can be monitored with or without data. Monitoring is terminated with an "end_monitor" command. Applications can also use the "enable_events" and "disable_events" commands to determine which events they are to receive.
The valid event classes are:
All: all events
Device: device events
Port: port and channel events
Profile: profile events or API calls
Sharing: share request events or AFI calls
A default event handler generates responses for all events not explicitly handled via an applications.

Events are handled by registered event handles: four types can exist in aware applications:
Application: this is the primary event handler thant handles the main events related to the general operation of an aware application. This event handler must be present in all aware applications, including a call manager.
Call_manager: this is somewhat specialised and handles those events concerned with application registration, name resolution, shutdown requests, passive nodes, call manager transfer, and global token status. This event handler must be present in all call managers.
Port_event handler: more than one port event handler may be present and each handles data communications related events.
Monitor: this is optionally present and handles all monitoring of events.

d) Other Programming Facilities

All channel ports can be associated with a user exit to monitor data traffic or process data. For a sending port, the user exit is invoked immediately prior to the data being transmitted to the receiving nodes; for a receiving port, the user exit is invoked immediately the data arrives at the receiving port but prior to the data being presented to the receiving application. Specification of a user exit routine on ports which have been connected may impact performance because the data must be surfaced to the user exit.
A full set of queries are provided to avoid applications needing to keep track of status information.
Application program debugging can be simplified by initially running collaborating applications at a single node; this avoiding physical networks being required during initial stages of program development.
No user interface code exists below the API; all user interactions are the responsibility of either the application program, or the code servicing requests across the resources interface.

Utilities

A number of pre-programmed utilities are provided in order to immediately provide useful function to end users and reduce the programming effort required to develop new collaborative applications, by providing common functions accessible through a command interface.

Figure 13:
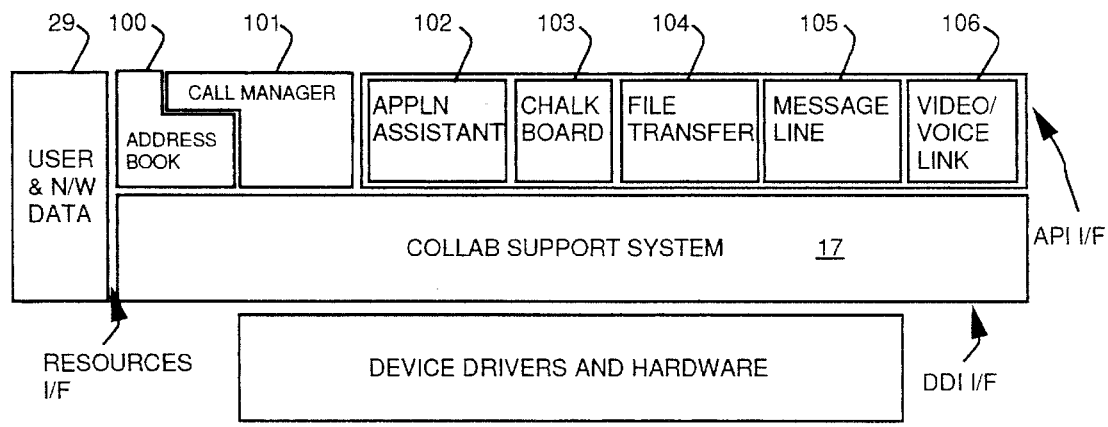
FIG. 13 illustrates exemplary utilities provided on top of the collaborative support system.

All the utilities are replaceable application programs. The structure of the provided utilities is shown below in FIG. 13. The supplied utilities install as a program group and are designed as a suite of applications which work together. The major utility functions can be invoked from other application programs by means of the "signal" command, as well as directly by the user.

a) Directory and Call Management i) Address Book

The address book utility 100 allows an end user to add, delete and update directory and connectivity information. The data is stored in a simple file structure which is easily edited by standard programs, although a mechanism is provided to interface with other potentially more extensive and complex address data-bases. User data can be grouped into logical collections known as phone books. The utility interfaces directly to the call manager; it also responds to queries through the resources interface.

ii) Call Manager

The call manager utility 101 implements the concept of a call. A call refers to a group of users collaborating by using shared applications. More than one call can exist at any time, users can be in more than one simultaneous call, and the same applications can be executed in multiple calls. For example: the users A, B and C can be in a call, x, to review a document; all may using voice communication with each other, A and B may also have a video link, and A and C may also have a shared chalkboard. Meanwhile, A, B and D may be in a second call y, to review a second document; with A and D using a chalkboard, and B and D using voice links.

The call concept does not exist in the API but it is implemented by the call manager through application sharing sets. Providing this support avoids the need for aware applications to be involved in call set-up or tear-down and provides clear separation of call management and application programming. The call manager provides dialogues for an end user to select names from the address book and logically establish a multi-point call. Parties can be added and deleted dynamically. Options provided include auto-answer and call barring. One call is deemed to be the current active call and it is the one to which shared applications are normally added when invoked. The current active call may be relegated to the background whilst another call is set-up.

b) User Utilities i) Application Assistant

This utility implements the following functions for users in a call:

direct mirroring of an existing application window, either as a snapshot or continuously, and has the system pointing device enabled as a remote pointer.

system clipboard support i.e. the ability for the contents of a system clipboard at one node to be optionally shared and/or viewed at other nodes.

remote DDE links able to be established between applications at different nodes.

redirection of printing to printers at other nodes.

ii) Chalkboard

The chalkboard 103 implements a common drawing area with two image planes, which is accessible to all users in a call. The background plane can be loaded from bit-map files, the system clipboard, or from the contents of an application window. The foreground plane can be used for interactive annotation using a range of simple text and graphics tools. Remote pointers over the chalkboard are also supported.

iii) File Transfer

File transfer 104 allows the transmission of files between users in a call. One or more ,files can be transferred, the files can be sent with comments, and the original file names are made available to the destination. The receiving node is in full control of file receipt and file naming.

iv Message

Message line 105 provides immediate sharing of text data between users in a call. Multiple simultaneous users are permitted; each participant sees all the exchanged messages, and in the same sequence. The message utility also logs activity during the call; such as calls set-up and terminated, and files transferred, In an actual embodiment this utility is provided as part of the call manager.

v) Video/Voice Link

This utility 106 allows the establishment of video and voice links between users in a call. The precise function available is dependent upon the capabilities of the physical network and the workstation hardware support.

Standards

The overall architecture is intended to support a broad range of collaborative applications. The interface is set at as high a level as possible, consistent with not imposing any significant restraints on the range of application models that may be implemented. The nature of the transport networks involved are totally hidden below the API. This means that an application is completely unaware of the network routing (eg direct or indirect), and the network types involved (eg single or multiple links, switched or fixed connections). A consequence of this approach is that the applications must be written expecting that requests, for example for a particular communications quality of service, may fail, since the underlying network may not have the required capability.

An agent philosophy has been implemented so that third party applications can be sued to act on behalf of other applications. This permits call manager, telephony, and switching applications to be developed. The current state of technology requries that analog networks and devices should be supported. It is attempted to treat analog networks like digital networks, in order to ease application migration.

At the API level, one of the key concepts exposed is that of applications sharing sets. Applications are expected to collaborate with other applications, and the mechanism for this colloboration is that they join each other in named application sharing sets. The essence of such an application sharing set is that all set members receive information on the status of all the other members; joining a set is the way in which applications declare those in which they have an interest. The concept of the call by contrast exists above the API, and in particular at the call manager. It is possible for different call managers to have different call models.

Alongside the application sharing set, the channel is the other fundamental concept in the architecture. Uni-directional channels are used as the basic communications building block to efficiently support both broadcast and two-way communications. The channels are established by the sending application, and accepted by the receiving application, because only the sending application can be aware of the properties of the data which dictate how it should be transmitted. Both applications can independently control the format to be supplied or received to or from their respective ports. Multiple logical channels, for each kind of data flow, allow the support system to allocate the traffic appropriately to the underlying transport network; moreover it lets other applications have data presented to them in separated, homogeneous flows, each individually described. Additionally this split of the inter-application traffic into individual data types, allow the support system to offer data conversion facilities.

Connections and welding of channels allows the transport of data to drop below the API so that the application is no longer involved in moving the data. The support system has the option, in some cases, of effecting the connection, either at a very low level at that node, or re-routing the flow away from that node.

The support system architecture is designed to permit inter-working between different computer platforms, operate over varied communications networks, and support relevant communication and data standards.

The separation of data traffic into logical uni-directional flows of homogeneous data, simplifies the mapping on to a mixed network and allows the use of multiple physical links, of different capabilities, between the nodes. Data multiplexing is handled below the application and can be implemented in different ways depending upon the underlying transport mechanism, e.g. by a combination of: allocating each logical flow to an individual physical link; multiplexing all the data in the support layer; or by leaving aspects of the multiplexing to a device driver. Through this means voice, video and data traffic, for instance, can be sent over multiple channels, over iso-LAN or iso-Ethernet, or over ISDN using the CCITT H320 recommendations. The quality of service requirements impose conditions on the required transport facilities: thus voice and video typically require dedicated physical links or shared links with isochronous capability, implemented through schemes involving priority and bandwidth management.

The separate logical data paths provided by channels, with their associated data types, ease inter-application operation because the data components are presented individually, with their nature and format independently available. Through this mechanism, a wide range of existing standards for voice, video, image, file transfer, and coded data can be supported, with the potential for the support system to perform data conversions in the network. The system also provides a separate data class for the interactive objects commonly used in collaborative applications, such as remote pointers, cursors and gestures.

Overview of the API Commands

The principal facilities offered by the API calls are detailed below. The syntax and parameters of the actual calls is not described because the intent is only to give an overview of the scope.

API Function Requests

Session and application sharing cancel_request: cancels a previous asynchronous request if that request is not already satisfied.

deregister_app: issued by an application instance to terminate its use of the API.

launch_app: issued by an application to invoke another application.

register_app: identifies the issuing application instance as a wire and establishes the application event handler.

set_call_manager: identifies the call manager for that node and establishes tile call manager event handler.

share_app: issued by an application instance to request the sharing of one application with another application.

shutdown_node: issued by an application instance to request the shutting down of the support system at its local node.

unshare_app: issued by an application instance to terminate the sharing of one application instance with another application.

Devices and Ports add_channel: adds, in a specified application instance, another channel to a specified sending port.

change_channel: changes the specified channel characteristics.

change_device_characteristics: changes the specified device characteristics.

change_port: changes the specified port characteristics.

claim_resource: call to a resource manager for resources associated with a particular quality of service.

close_device_port: closes the associated port on the defined device.

connect_ports: connects a specified receiving port to a specified sending port.

create_channel: creates a data transmission channel consisting of a sending port at the issuing application and a receiving port at the specified target application.

disconnect_ports: disconnects the specified receiving port from the specified sending port.

open_device_port: opens a port on a defined device.

remove_channel: removes the channel associated with the specified receiving port and the specified sending port.

request_resource: enquiry to a resource manager for resources associated with a particular quality of service.

resume_port: resumes data transmission through the specified port.

signal_port: transmits a control string through a specified port.

suspend_port: suspends data transmission through the specified port after draining or flushing any data not yet received.

weld_connection: makes the connection of the specified receiving port and the sending port permanent.

Data Transmission and Receipt receive_data: receives data from the specified receiving command port.

send_data: sends data asynchronously through the specified sending port. Various transmission acknowledgements may be requested.

signal: transmits support system or application defined control data over a support system established control channel to a specified application instance.

signal_app_with_reply: transmits support system or application defined control data over a support system established control channel to a specified application instance, and returns the response data.

start_sync: starts the synchronisation of data received through receiving ports associated with a specified channel set.

stop_sync: stops the synchronisation of data for all receiving ports associated with a specified channel set.

Token Management get_token: requests the immediate holding of the specified global or application token either exclusively or in a shared manner.

give_token: gives the specified token to the specified requester.

qget_token: requests either the holding of the specified global or application token either exclusively or in a shared manner, or, if the token is not available, the joining of a request queue maintained by the current owner.

reclaim_tokens: forces the specified token held by the specified application instance to be immediately released back to the current owner of the token.

refuse_token: refuses the specified token to the specified requester.

release_token: releases the specified held token back to the current owner.

return_token: requests that the specified application instance holding the specified token should return the token back to the current owner as soon as possible.

set_token_owner: sets the owner of the specified token to the specified application instance.

Event Control
  begin_monitor: causes special monitoring events identifying each occurrence of an API call, and/or a normal event to be presented to the specified monitoring event handler,
  default_event_handler: returns default responses for all events that an application programme does not wish to handle explicitly.
  disable_events: stops events of the specified event class being passed to the event handler of the issuing application instance.
  enable_events: allows events of the specified event class to be passed to the event handler of the issuing application instance.
  end_monitor: stops the special monitoring events identifying each occurrence of an API call, and/or a normal event being presented.

Profile Management
  read_profile_string: returns a character string of a specified keyword in a specified section from a profile file.
  write_profile_string: copies a character string to a specified keyword in a specified section the profile file.

API Queries
  query_address: returns the completed full address of an application instances belonging to a named sharing set.
  query_application_status: returns status of an application (unaware, aware or call manager).
  query_channel_characteristics: returns the channel characteristics of the channel associated with the specified sending and receiving ports.
  query_channel_set: returns the handles of all the ports in a specified channel set.
  query_device_characteristics: returns the device characteristics of the specified device.
  query_device_status: returns the status of the specified device.
  query_monitor: returns the class of functions or events currently being passed to the monitor event handler.
  query_port_characteristics: returns the characteristics of the specified port.
  query_port_status: returns the status of the specified port.
  query_resource: returns the resources available in the specified resource set,
  query_sharing_set: returns the sharing set identifiers for an application instance,
  query_token_holder: returns the owner (application tokens only) and holder of a token,
  query_token_state: returns the state of the specified token, API Events Call Manager Events
  APP_DEREGISTERED: an event to the local call manager when the application instance terminates its use of the API,
  APP-REGISTERED: an event to tile local call manager when an appliication initializes its use of the API,
  CALL_MANAGER_ERROR: an error has occurred which affects the call manager,
  CALL_MANAGER_REQUEST: an event to the local call manager indicating that another local application has issued a set_call_manager function request,
  NODE_SHUTDOWN_REQUEST: a request for the support system to shut down.
  PASSIVE_NODE_RELEASED: an indication that the resources allocated to allow the node to support passive requests may be released,
  PASSIVE_NODE_REQUEST: a request for the node to allocate resources to support a passive request,
  SHARE_REQUEST: a request to share with a named application,
  TOKEN_STATUS_REQUEST: a request for status of a global token, Application Events
  APP_SIGNAL: a signal has been received.
  APP_SIGNAL_REJECTED: a signal has been rejected.
  APP_SIGNAL_WITH_REPLY: a signal_with_reply has been received.
  APP_SIGNAL_TRANSFERRED: a signal has been transferred.
  APP_UNSHARE_REQUEST: a third party local application has requested that the recipient leave an application sharing set.
  APP_UNSHARED: a notification the issuer is leaving an application sharing set has been received.
  APP_ERROR: a related application error has been detected.
  NODE_SHUTDOWN: a shut down has been initiated.
  PORT_REMOVED: a confirmation that a port has been removed.
  PORT_REQUEST: a request to add a receiving port.
  RESOURCE CLAIM: raised whenever an application claims its quality of service resources.
  RESOURCE REQUEST: raised whenever an application requests its quality of services resources.
  PROFILE_CHANGED: an indication that the LAKES.INI or LAKESQOS.INI file has been changed.
  SHARE_CONFIRMED: a confirmation that a share request had processed has been received.
  SHARE_REJECTED: a request to share has been rejected.
  SHARE_REQUEST: a request to share has been received.
  SHARE_TRANSFERRED: a request to share has been transferred,
  TOKEN_CANCEL_REQUEST: a request to cancel a queued token request bas been received.
  TOKEN_GIVEN: a token has been given to a requester.
  TOKEN_QREQUEST: a request to hold a token or to join the queue if the token is unavailable.
  TOKEN_RECLAIMED: a token has been taken away by owner.
  TOKEN_RECLAIMED: a token has been taken away by owner.
  TOKEN_REFUSED: a request for token has been refused.
  TOKEN_REQUEST: a request to hold a token.
  TOKEN_RETURN_REQUEST: the owner of the token requires that the token be returned as soon as possible.

Device and Port Events
  CHANNEL CHANGED: some channel characteristics have been changed.
  CHANNEL_CONFIRMED: a new channel has been created.
  CHANNEL_DESTROYED: a channel has been destroyed.
  CHANNEL_REJECTED: a channel has not been created.

CONNECTION_WELDED: a wel connection notification has been received.

DATA_AVAILABLE: data is available at a receiving port.

DATA_CONFIRMED: a confirmation of a data transmission has been received, or an estimate of the progress of a data transmission.

DATA_REQUESTED: data is requested from a sending port.

DEVICE INFORMATION: an event raised to the sending port event handler of the application instance that is to supply device information.

PORT_ERROR: a port: error has been detected.

PORT_RESUME_REQUEST: a resume port request has been received.

PORT_SIGNALLED: a signal port event has been received.

PORT_SUSPEND_REQUEST: a suspend port request has been received.

PORT_SYNC_REQUEST: a request to adjust the synchronising control has been received, Monitor Control Events EVENT_MONITORED: a notification of function request and event activities has been received.

Channel_1_, Port and Link Characteristics

Channel Characteristics

The following parameters are associated with a channel and are established on the creat_channel and add_channel requests.

quality_of_service:
  signal type (analog or digital)
  throughput
  latency
  jitter
  lateness
  priority
  compression hints
  encryption
  Quality of service characteristics are associated through data type and subtype in the LAKESQOS.INI file, but can be specified explicitly. They may be left undefined; this allows channels to be created whose operational characteristics depend upon the resources available when data is being sent down the channel.

channel_type:
  standard
  merged
  serialised
  synchronised channel_set_id:
  identifier Port Characteristics The following parameters are associated with a port; all except port-type are defined explicitly; sending ports specify these parameters on the create_channel request, receiving ports specify them on the PORT_REQUEST response.

connect_type:
  command
  event
  null event_handler:

port_type:
  sending
  receiving data_class:
  data type
  data sub-type user_exit:

user_information

Link Characteristics

The following quality of service parameters are associated with a physical link and are specified in the network data base accessed via the link locator, or obtained as defaults from the LAKESQOS.INI file.

signal type (analog or digital)

throughput latency jitter frame size frame error rate frame re-transmission time compression hints encryption Support System Structure Referring back to the support system structure as illustrated in FIG. 10, the various tasks of the components thereof will now be described in more detail. The application manager 223 acts as an interface to the rest of the support system, providing an entry point for all the API calls which are then distributed to the appropriate component after a certain amount of parameter verification, It is also used to scan incoming calls/outgoing events if monitoring is required (see below).

The application manager is responsible for calling back the application at the event handler specified when a channel is created. The events will be those raised at the sending port if the local application created the channel, or then receiving port if the remote application created the channel. When creating a port, the application manager passes the address of an event queue handler which will handle all the events for a particular application and place them in a queue. Then, some mechanism such as a dispatch thread continuously reading the event queue sends the event to the application's event handler.

The channel manager 227 has five sub-components: a channel supervisor, responsible for starting and shutting down all the other components; a control channel sub-component, which handles control channel communications between support systems at different nodes; a data channel sub-component, which handles all other non-control channel data communications; a node manager, which creates, destroys, and maintains node handles and sets of node handles; and a port manager, which creates, destroys, and manipulates ports and does port query functions.

The resource manager 225 is the first component in the support system to get control. It is responsible for initialising all the other components, as well as interfacing to any address book or route selection facilities. The token manager 224, as its name suggests, is responsible for the logging and management of tokens, both global and application tokens (global tokens are owned by the respective call manager components; by contrast application tokens are owned by a node in a sharing set).

The device manager 224 is responsible for interactions between the support system and devices, and in particular performs the following functions: resolving devices names to fully qualified path etc, loading appropriate dynamic link library (DLL), generating a record containing the port number, port handler and event word, calling the initialisation entry point, and resolving all entry handles in the DLL to physical address for the application call manager. The signal manager 226 is responsible for signalling to applications (with or without reply) and to ports.

Sharing and Call Manager Installation

Having now described the overall operation of the collaborative support system, various sharing and call manager set up operations will now be described in more detail. The API command which establishes a call manager is set_call_manager.

The set_call_manager function requests that the issuer be established as the new call manager at the issuing node and identifies the event handler to be invoked for call manager events.

Parameters required by the set_call_manager functions are:

| | |
|---|---|
| event_handler | the event handler to be invoked for call manager events. |
| event_word | A user specified data pointer passed to the call manager event handler on all call manager events. |
| call_manager_info | (returned). The value returned by the current call manager in response to the SET_CALL_MANAGER event. |

The set_call_manager() function identified to the subsystem the event handler that is to receive any events of a non-application specific nature, i.e. any incoming events from tile network that do not identify a specific application instance. (Note. The events may specify a destination application name, in which case, it is the function of the call manager to resolve the name to a specific instance).

Only one set_call_manager() event handler can be active at any one time on any given node. More than one set_call_manager() may be issued by applications running on a given node, but the last one issued is the one that is ill effect (i.e. that application instance is the call manager for that node).

Before issuing the set_call_manager() function call an application must have issued an register_app() function all to identify itself to the local system.

When a new application issues a set_call_manager() function call, the processing depends on whether or not there is already an existing call manager.

If no call manager exists then no event is raised and the issuer becomes the current call manager.

If a call manager already exists then it will receive a SET_CALL-MANAGER event. This existing call manager has the option of allowing the transfer of the call manager function to the new application or rejecting the request. In this case the existing call manager stays in control and the issuer receive the RC_CM_REQUEST_REJECTED return code. This allows some control over which applications are authorised to become call managers.

There must always be an application instance running that has issued a set_call_manager, otherwise no communication can happen with any other node.

The LAKES.INI file can have a section in it, specifying the names of the applications that are authorised to become call managers. So that when a SET_CALL_MANAGER event is raised at the current call manger, it can check in the file via the get_profile_string function call to see if the application is authorised.

The register_app function registers the name of the issuing application instance and the event handler to handle incoming events.

Parameters required are:

| | |
|---|---|
| application_name | The name by which the issuing application is to be known to the system |
| event_handler | address of the event handler to be invoked by the system to handle incoming events for the issuing application instance. |
| event_word | A user specified data pointer passed to the call manager event handler on all call manager events |
| node_handle | (returned) node handle to issuing node |
| application_handle | (returned) application instance handle to issuing application. |

In order for an application instance to be allowed to communicate with the system, it must identify itself by issuing an register_app call. This call must be issued prior to any other calls from this instance, otherwise the calls will fail and an error code returned.

The application_name, event_handler and the event_word must be supplied. The node_handle and application_handle are returned by the system. They define the unique handles within the node and have no scope or meaning outside of the local node.

As a result of the register_app function call, an APP_REGISTER event is raised in the call manager even handler if one exists. If no call manager exists then no event is raised and the issuer of the register_app function call will receive the return code RC_NO_CALL_MANAGER, The issuer should then either become the call manager by issuing the set_call_manager() function call or terminate by issuing the deregister_app() function call.

This is the only function call that is valid prior to a set_call_manager() having been issued, i.e. prior to a valid call manager having been identified.

The launch function causes the specified target application to be invoked.

Parameters required are:

| | |
|---|---|
| target_application | pointer to a structure containing the full address of the target application. The full address structure type is defined as follows: |
| target_exe_string | pointer to a character string specifying the fully qualified name (including the full path) for the executable for the target application. |
| working_directory | pointer to a character string specifying the directory. IF the working_directory is null then the current directory is assumed. |
| parameters | a user specified string that is given to the launched application. |
| application_handle | (returned) application instance handle of the launched application. |

This function is used to ask the system to start another application instance. IF the new application is started successfully then its instance handle is inserted in the target_application and returned to the calling application.

It is up to the launched application to use an register_app to fully identify itself to the system (if it is to be an aware application). launch may be issued by any aware application, it is not restricted to the currently active call manager.

The share function requests that the specified target application be shared with the specified source application.

Parameters required are:

| | |
|---|---|
| async_id | a user supplied reference id by which this call and all events related to this call may be identified. This parameter can not be zero. |
| source_application | pointer to a structure containing the full address of the source application. |
| target_application | pointer to a structure containing the full address of the target application. |
| user_info | a user specified string that is returned on all events generated by this share. |

Possible Return Codes are:

| | |
|---|---|
| RC_OK | Operation completed successfully. |
| RC_FAIL | LAKES environment not established. |
| RC_SHARE_CONFIRMED | returned to a synchronous share( ) to confirm that the share has been accepted |
| RC_SHARE_REJECTED | returned to a synchronous share( ) to confirm that the share has been rejected |
| RC_INVALID_ADDRESS | Invalid address structure |

The share function request that the source application and target application are to be (or added into) an "application set".

If the target application is specified by name, then the call manager at the relevant node will be invoked, it is then the responsibility of the call manager at the target node to decide how to handle the share request.

If the target application is specified by instance handle, then the share request is passed directly to the desired application and does not go via the call manager.

The user_info parameter would should normally be used to tell the target node how or why the application is to be shard.

The appropriate return code (RC_SHARE_CONFIRMED or RC_SHARE_REJECTED) will be returned. If the local system receives a subsequent SHARE_CONFIRMED event from the target application then this event is not raised to the issuer of the share function call but is handled by the system generating an appropriate UNSHARE event, IF the local system received a subsequent SHARE_REJECTED event from the target application then this event is ignored.

A share request specifying an application name rather than a handle, is directed to the call manger. This allows the call manager to decide how treat the share, e.g. it could:

launch the specified application thus creating a new instance launch a completely different application.

direct the share to an existing instance redirect the share to a different instance handle the share entirely within the call manager.

If the call manager issued a launch for an application as a result of a SHARE_REQUEST event, it must then re-issue the share request on behalf of the original requester to the launched application.

The unshare function terminates the sharing between the source application and the applications in it sharing set.

PARAMETERS required are:

| | |
|---|---|
| async_id | a user supplied reference id by which this call and all events related to this call may be identified. This parameter can not be zero. |
| source_application | pointer to a structure containing the short address of the source application. A short address structure is defined as follows. |
| user_info | a user specified string that is returned to all the application instances remaining in the shared set on the events generated by this unshare. |

This function is used to remove an application instance from a set of sharing applications, it does not terminate the application. All other applications in the set will receive an event to indicate that the instance is no longer part of the sharing set.

The user_info parameter- should be used to tell the other instances in the application set why the unshare is being done.

Any ports owned by the instance will be dropped and events raised at the other end(s) of the logical channel(s).

The event handler set-up by the register_app is still active and will receive events directed via the system or the call manager.

Figure 14:
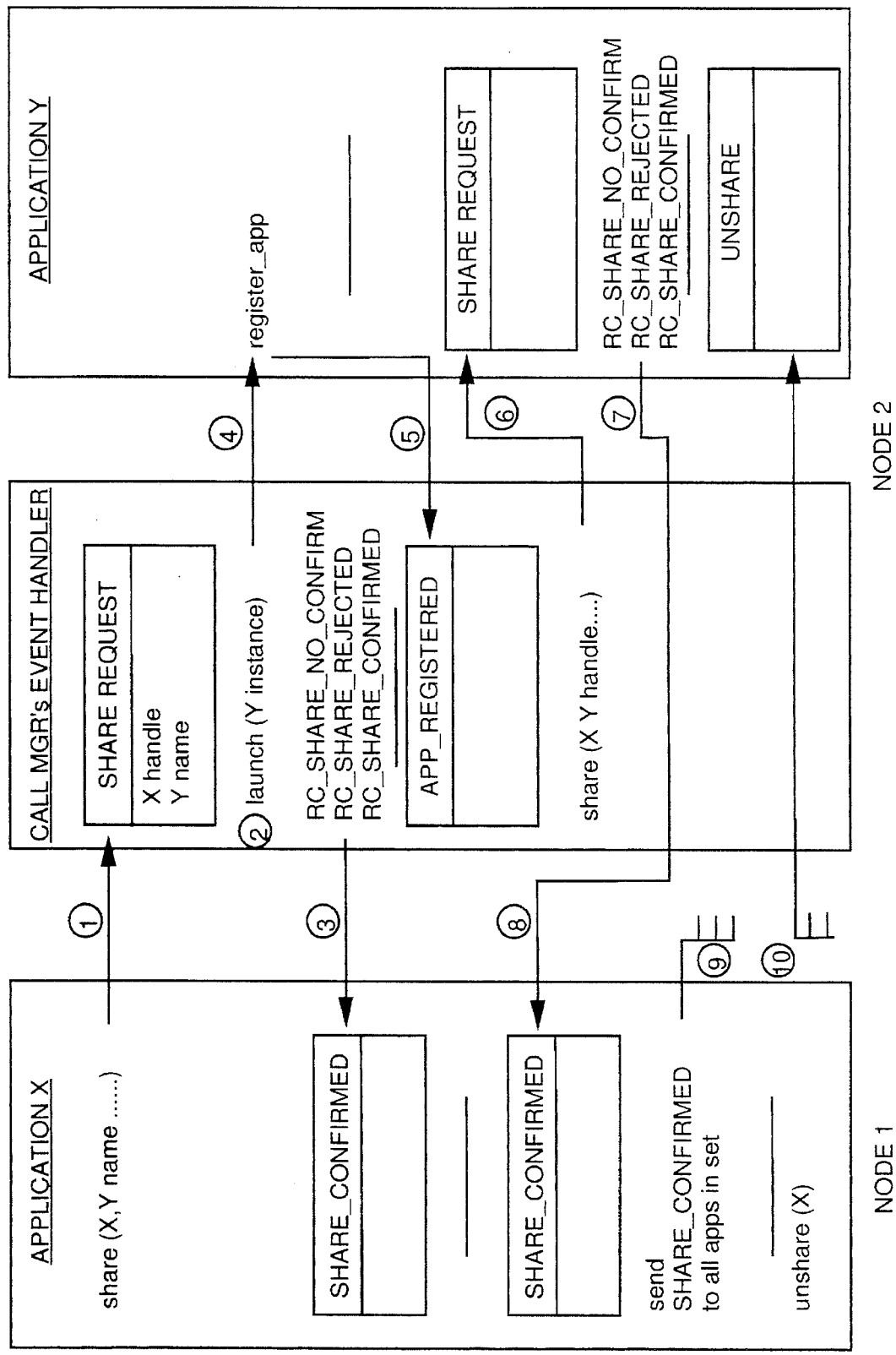
FIG. 14 illustrates the flow of requests and calls to initiate and terminate sharing between/two applications using the call manager.

Typical flows for the control of sharing are illustrated in FIG. 14. For a share in which only the name and not the handle of the target application is specified then the SHARE_REQUEST event is raised initially in the call manager at the target node. For a share request in which the handle of the target application is specified the SHARE_REQUEST event is raised directly in the target application.

At Step 1

Application X issues an asynchronous request to initiate sharing with application Y, Since the request specified only Y's character string address the SHARE_REQUEST is raised to the call manager at Y's node, node 2.

At Step 2

Y's call manager has a number of options. It may reject the share request (RC_SHARE_REJECTED), it may satisfy the share request itself (RC_SHARE_CONFIRMED), or it may decide to pass on the share request to a new instance of application Y, (RC_SHARE_NO_CONFIRM).

At Step 3

If the call manager returns either RC_SHARE_REJECTED or RC_SHARE-CONFIRMED then the subsystem will raise either a SHARE_REJECTED event, or a SHARE_CONFIRMED event at the requester.

At Step 4

If the call manager issues a launch function call specifying Y as the target application then a new instance of Y is started. The subsystem allocates an application handle for Y and returns it to the call manager. It is assumed that after being started Y will want to become aware hence it will issue an register_app function call identifying itself to the subsystem. The subsystem returns to Y the handle it allocated at launch.

At Step 5

As a result of the register_app the subsystem raises an APP_REGISTERED event to node 2's call manager.

At Step 6

Node 2's call manager will then issue a share request on behalf of X specifying Y's handle and return with a RC_OK.

At Step 7 application Y will then receive a SHARE_REQUEST event identifying X as the requester. Y may then either reject (RC_SHARE_REJECTED) or accept (RC_SHARE_CONFIRMED) the share.

At Step 8

X will receive the appropriate SHARE_REJECTED or SHARE_CONFIRMED event.

At Step 9 if the share is accepted and X is also sharing with other application instances then the subsystem at node 1 will send a SHARE_CONFIRMED event naming X as the source and Y as the target and also Y as the new sharer to all these applications. In turn, the subsystem at the nodes where these applications are running will send SHARE_CONFIRMED events to Y naming X as the source, Y as the target and themselves as the new sharer.

Finally at Step≠10

X may later issue an unshare() to leave the sharing set. All remaining applications in the set will also receive an UNSHARE event.

The Call Manager plays a key role in determining the behaviour or personality of the subsystem at a workstation. The Call Manager utility 101 (FIG. 13) supplied with the subsystem will now be described in detail.

The supplied call manager utility allows a clear separation of call management and application programming. Use of tile shipped call manager therefore removes the need for aware applications to be involved in call set-up or teardown. It provides dialogues for an end user to select names from the address book and logically establish a multi-point call. Parties can be added and can leave dynamically and several calls may be in progress simultaneously. Options provided include auto-answer and call barring, In order to separate the look and feel of the call manager from the function, the call manager is actually implemented as two separate programs—the engine and the user interface. The engine provides call management function, whilst the user interface determines tile look and feel. The call manager engine has a command interface to all it to be controlled by other applications (in fact this is how the user interface portion control the engine). The engine maintains an application table, for each local application instance currently running, a call table, for each call, a command table for each application currently in the command sharing set (and therefore eligible to send commands to the engine), and a link table, listing each passive link currently in effect.

The Supplied Call Manager Utility

The Call Manager lets the user initiate the following actions:

start a new call (note that a node may be engaged in several calls at the same time, each with their own set of shared applications and other parties)

add an existing unshared application to a call unshare an existing application from a call extend a call by adding a new person to it (if the callee accepts, any current applications within the call will be shared with them)

leave a call (in which case any shared applications will continue to run but will no longer be part of a sharing set)

shutdown the system (all current calls will be terminated and all applications will become essentially unaware as part of the shutdown process)

launch an application cancel an outgoing request if the callee is not responding The user can also set various options, for example to indicate if incoming calls are to be automatically accepted or rejected and how requests for passive working are to be handled.

Figure 15:
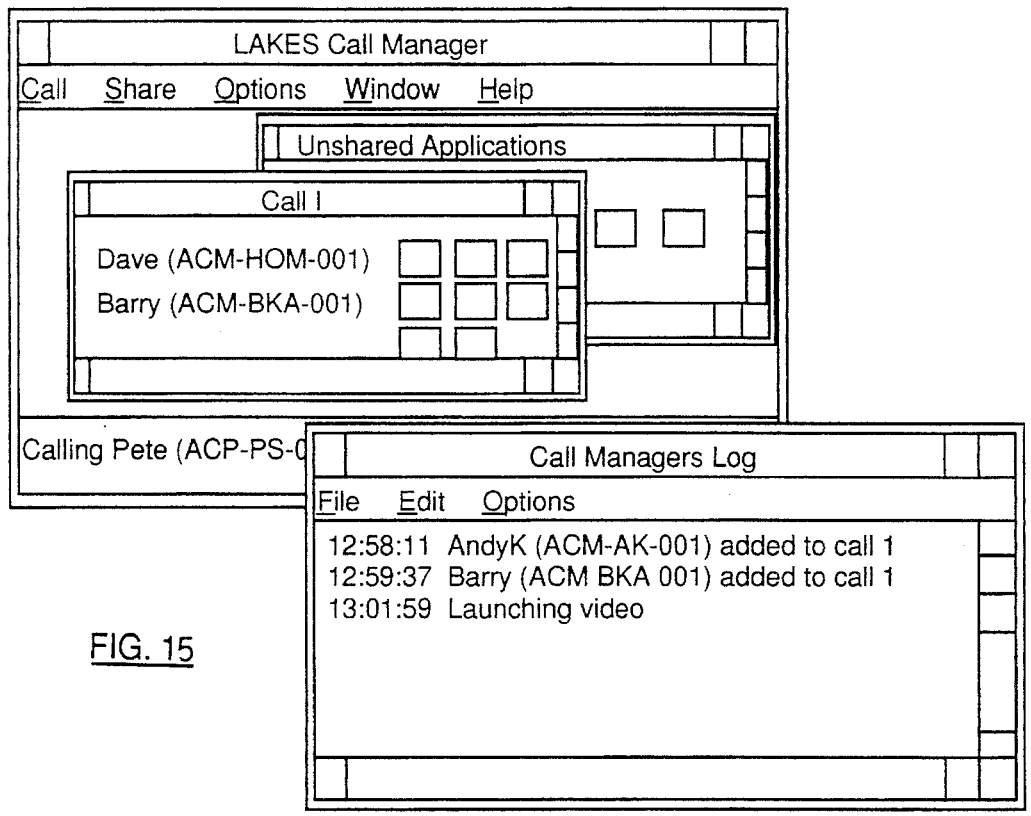
FIG. 15 illustrates the user interface of the call manager.

As shown in FIG. 15 the Call Manager user interface consists of a main window, complete with action bar and client area, the latter containing an information area, which displays messages and other status information, as well as context-sensitive prompts for the menu pulldowns.

The actionbar provides the following options:

Call

| | |
|---|---|
| New | start a new call |
| Add | add person to call |
| Hang Up | end the current call |
| Cancel | cancel and Add or New |
| Shutdown | end the Call Manager (and all calls) |

Share

| | |
|---|---|
| Share | add an existing unshared application to the current call |
| Unshare | unshare an existing application from the current call |
| Launch | launch a new application |

Options

| | |
|---|---|
| Auto | answer automatically accepted |
| Passive | whether this machine may be used as a gateway by others |
| Sound | if ticked, then a "ring" accompanies incoming calls |

Window

| | |
|---|---|
| Log | displays or hides log view |
| Windowlist | list of all child views and log view |
| Cascade | cascades the child views |
| Tile | tiles the child views |
| Arrange icons | arranges icons of child views |

Other windows that can be displayed are the Unshared view, of aware applications currently running which are not shared in a call, a Call view, a list of the nodes in a call, and for each node, a list of the shared applications which are running there, and Log view, which is a separate window, not a child window of the control window, which contains a record of time-stamped events.

The Call Manager includes event handlers to handle call manager events, such as local application initialisation and named share requests from other nodes.

Calls and Sharing Set

The concept of a call, as implemented by the Call Manager, has no real counterpart in the subsystem. In essence, a call consists of one or more named sharing sets, sets of application instances which know about each other. Each set consists of a single application that is running at each node within the call. The call manager itself is in one such sharing set for each call. Only the Call Manager (and hopefully the user!) is aware of how the various sharing sets at a given node are grouped into calls.

Since a call consists of one or more sharing set, the various call manager functions are in fact operations on sharing sets. Thus to start a new call to a remote node, the call manager creates a call name, typically by appending a numeric suffix to the node name, incrementing the number after each call. It then attempts to share, using this name, with the call manager at the remote node. If the share is accepted, the call has been established. To add a new node to an existing call, the call manager merely tries to share with the call manager at the new node, using the call name as the sharing set name. To join an existing call from outside, the call manager merely tries to share with the call manager at one of the nodes in the call, passing the the name of the call to be joined. To leave a call, the Call manager unshares from the appropriate set. To add a new application into a call, the call manager issues shares on behalf of the application to each node in the call in turn, using the call name as the sharing set name. Note that once there are applications in the call then each time a new node is added a share will be issued to it for each application.

Figure 17:
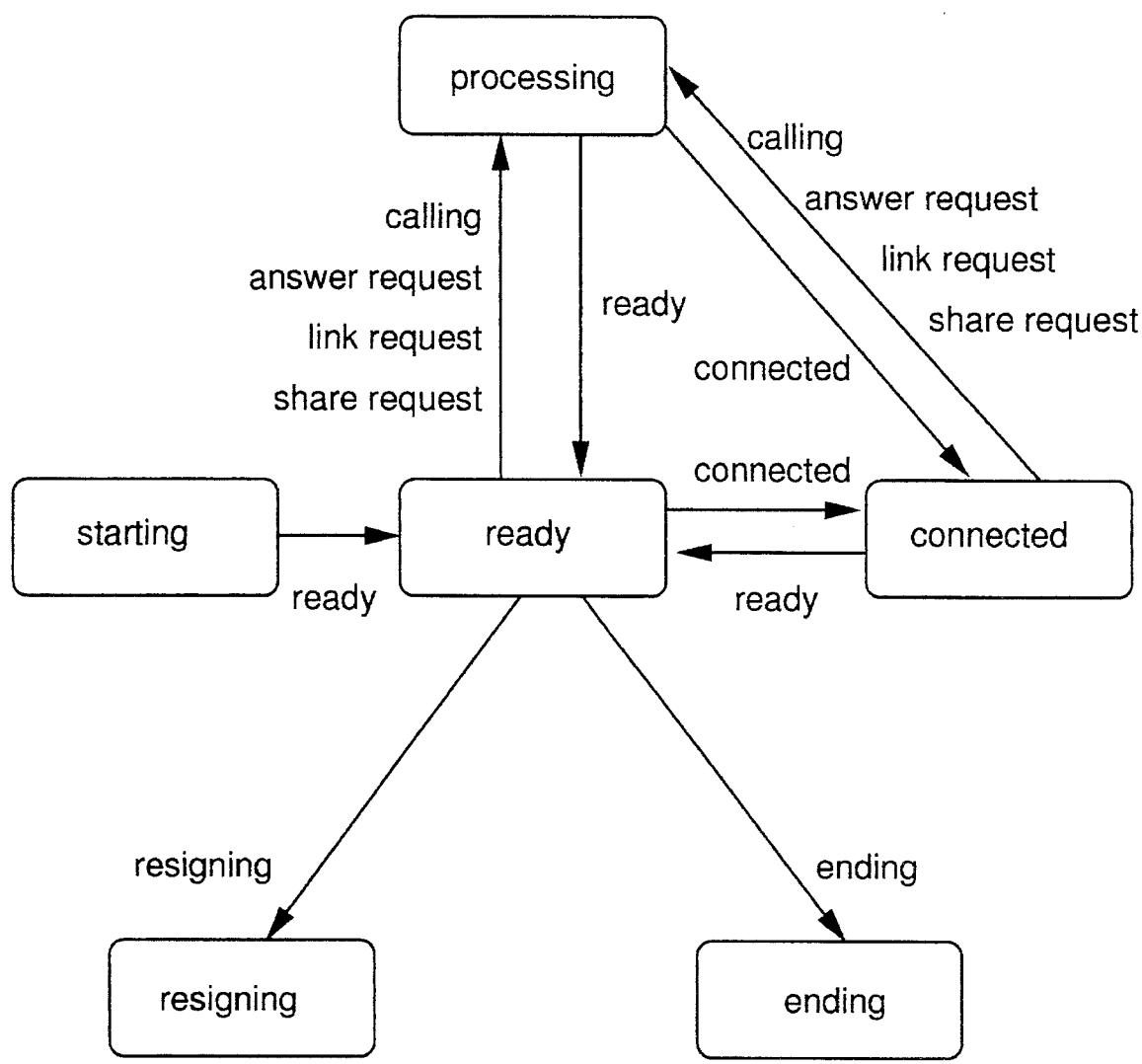
FIG. 17 illustrates the six main states of the call manager and the transitions between them.

There are six main states for the call manager, as shown in FIG. 17. These are starting, ready, connected, processing, ending, and resigning. Starting occurs from the point at which the engine is launched until it has completed its initialisation. The engine then enters the ready state, waiting for commands from the user interfae of some other application which has shared with the engine. Some of the events passed to the engine's event handler from the support system result in signals being sent to the user interface component so that this in turn can inform the user and if necessary obtain a response which can be fed back via a command to the engine. The engine enters the connected state as soon as a call is in progress, it returns to the ready state as soon as no calls are in progress. While in this state it will accept the same set of commands as the ready state, with one exception, the shutdown command. The engine enters the processing state whenever it is waiting for the user interface to respond or for a support system event to occur. While in this state certain commands, such as call, are rejected with the "engine is busy" indication. Certain support system events, such as SHARE_REQUEST are also rejected.

The engine enters the ending state as soon as the NODE_SHUT_DOWN_REQUEST event has been received and accepted. Note that the engine must be in the ready state for a shutdown to proceed, if any calls are in progress, these must be terminated first. The engine enters the resigning state as soon as it has accepted a CALL_MANAGER_REQUEST. The state is similar to ending in that the engine will terminate, but the rest of the support system will not. The engine will only resign if it is in the ready state, if any calls are in progress these must be terminated first.

Figure 16:
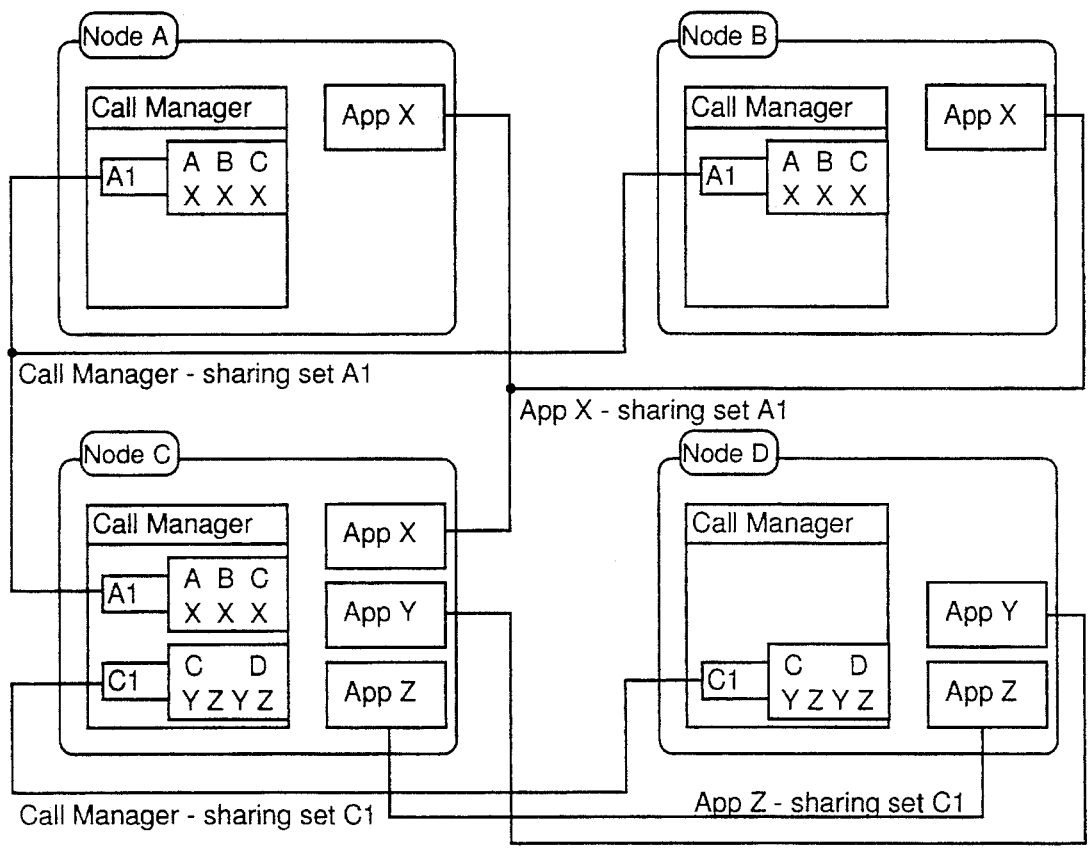
FIG. 16 illustrates an example of the arrangement of calls between four nodes.

FIG. 16 shows 4 nodes, A, B, C and D. Node C is involved in two calls:

1. a call involving two application sharing sets, Y and Z and node D
2. a call involving a single application sharing set, X and nodes A and B Call Manager Event Handling The key events which the Call Manager handles are:

| | |
|---|---|
| APP_REGISTERED | this is raised when a (local) application issues the register_app call |
| MONITOR_EVENTS | in order to see both the local and remote effects of an unshare, the call manager must monitor these events. |
| PASSIVE_LINK_REQUEST | this is raised when the system wants to use resources at this node to support the needs of other nodes |
| PASSIVE_LINK_RELEASE | this is raised when resources at this node are no longer needed by the system to support the needs of other nodes |
| SET_CALL_MANAGER | this is raised when another application issues a set_call_manager call |
| SHARE_REQUEST | this is raised when a request is received from another node to share with a named application |
| SHARE_REJECTED | this is raised when a local application refuses a share request (normally the result of some sort of error) |
| SHUT_DOWN_REQUEST | this is raised when a request has been made, either by the user or by an application, for the system at this node to be shut down. |
| SIGNAL | this is raised when an application issues a signal whose target is either null or a name rather than a handle |
| APP_DEREGISTERED | this is raised when an aware application terminates |

These events are handled as defined below

Register_app

The Call Manager makes a note of the name of the application which is starting, adding it to the list of applications in the sharing set for the appropriate call, or the unshared list, depending on which is active. If a call is active and the application was started by the user, the Call Manager will issue a named share call to each remote node in the call so that the application gets shared across the call. If the application was launched by the Call manager as a result of an incoming share request, the Call Manager completes the share by issuing a local share on behalf of the remote node/application.

When applications terminate, their names are removed from the appropriate list (see APP_DEREGISTERED below).

The Call Manager always returns RC_OK for APP_REGISTERED events.

PASSIVE_LINK_REQUEST

This event is handled in a straightforward manner. The Call Manager checks the state of the Passive Working option. If it is permit, the request is accepted, while if it is deny the request is refused. If it is ask, the Call Manager puts up a dialogue box asking the user if the request is to be accepted (the panel displays as much information about the request as possible) and then accepts or rejects the request depending on the users response (by returning RC_OK or RC_FAIL).

MONITOR_EVENTS

The two events that the Call Manager is interested in are the results of an unshare call (raised locally) and an unshare event (raised remotely). The Call Manager reacts to them by removing the application from the appropriate list.

If the unshare comes from a remote call manager, this is indicating they have left the call, so the Call Manager responds by dropping them from the appropriate call list. In the case where there were only two parties in the call (i.e. the call has effectively ended), the Call Manager unshares and moves any applications still listed as within the call to the unshared list and then removes the call.

The Call manager returns RC._OK for all events.

PASSIVE_LINK_RELEASE

This event is generated when the channels using the passive link are destroyed. When it occurs, the Call Manager merely updates the main window to indicate that the passive link is no longer present and returns RC_OK.

SET_CALL_MANAGER

The Call Manager responds to this event by returning RC_OK, which allows the transfer of the Call Manager role to the new application.

SHARE_REQUEST

The Call Manager looks at the name to be resolved. If this is the call manager name, then this is really a request from a remote call manager to start a new call. The user info will contain the ID of the call (i.e. the ID assigned by the remote node). This is needed to resolve ambiguity in cases where the two nodes are involved in more than one call with each other.

In this case, the Call Manager responds checking the state of the Answer option. If it is manual, the Call Manager puts up a dialogue box asking the user if the request is to be accepted (the panel displays as much information about the request as possible). If it is auto-answer, the request is accepted.

If the request is not from a call manager, it must come from a node which is already a party to an existing call. Because of this, such incoming share requests are always accepted. Note that the incoming share request contains a call ID. This is because a given pair of nodes may have more than one call in common and allows the resulting ambiguity to be resolved. To accept the share request, the Call Manager attempts to launch the corresponding application. It looks in the LAKES.INI file for an entry in the APPLICATIONS section whose KEYWORD matches the target application used in the share request. If none is found, an error is reported. If an entry is found, the value in the profile entry is used to fill in the fields of a launch call, which is then executed. The APPLICATIONS section might look like this:

[applications]

chat=c:\lakes\apps\chat.exe, c:\lakeskwork, . . .

chalkboard=c:\lakes\apps\chalk.exe, c:\lakes\work, . . .

filetransfer=c:\lakes\apps\xfer.exe, c:\lakes\work, . . .

The Call Manager makes a note of the handle of the launched program, so that when the corresponding Register_app event occurs it doesn't try to share it again (see the APP_REGISTERED event above). If the launch fails, then RC_SHARE_REJECTED is returned. One the other hand if the launch is successful, the Call Manager returns RC_SHARE_NO_CONFIRM. When the launched application later issues register_app, the Call Manager will issue a share call and the application should then return RC_SHARE_CONFIRMED.

Note that the Call Manager described here never resolves an incoming share request by sharing with an application that is already running—a new instance is always launched.

SHARE_REJECTED

As noted above, an application launched by the Call Manager will, once it has registered, be the target of a share issued by the Call Manager.

Normally, it should respond with RC_SHARE_CONFIRMED since the Call Manager has already accepted the call. In tile case where an application cannot accept a share (for example, due to lack of resources), the rejection will be sent to both the Call Manager and the original remote application. The Call Manager responds by "forgetting" the original share and returning RC_OK.

SHUT_DOWN_REQUEST

The Call Manager responds to this event by returning RC_OK, which allows the shutdown to continue. This will in turn cause all applications (including the Call Manager) to receive a SHUT_DOWN event, when the system is actually shutting down. Like the other supplied applications, the Call Manager reacts to this event by de-registering.

SIGNAL

Two types of signal will cause a SIGNAL event to be raised in the Call Manager:

1. a signal whose target_application parameter is null. Such events are treated as Call Manager commands 2. a signal whose target_application parameter mentions an application by name rather than by handle. The Call Manager resolves the name by checking if an application of that name is currently running (i.e. an register_app has been issued which uses that name)

if so, the signal is transferred to that application (if there are several, the signal goes to the first instance)

if there are none, the Call Manager does not launch a new instance. Instead the signal is ignored.

APP_DEREGISTERED

This event is generated when an application terminates. The Call Manager responds to this event by removing the name of the de-registering application from the appropriate call list, updating the main window appropriately and returning RC_OK, A Simple Example One possible sequence of events is as follows:

1. user A calls user B (resulting in the sharing of call managers)

2. user A starts chat application (which will be shared by A's call manager and thus launched by the call manager at B, forming the first application sharing set)

3. users A and B chat for a while, then user B terminates the chat application (which ends the sharing set). Although the chat application continues to run at A, it appears on the unshared list as it no longer part of the call.

4. user B starts the chalkboard application. Since the two users are still in a call, the call manager at B will issue a share, and thus A's call manager will launch the chalkboard there, forming a new sharing set.

5. user A hangs up the call.

Looking at this sequence at the API level, we would see something like the following:

1. The Call manager at A starts the process by issuing a share with B. At B, the Call Manager will note that the share involves the call manager (and is therefore asking to set up a new call). Assuming the call is to be accepted, the call manager accepts the share between call managers.

2. When the user at A starts the chat application, the call manager at A (which sees the register_app event) will issue a share. At B, the call manager will accept the share request by issuing a launch for the corresponding application.

3. When user B terminates the chat application, there will be an automatic unshare issued by the subsystem at B. Since both call managers are monitoring unshare calls and events, they will both be notified of the unshare and can thus update their call lists. The call manager at B will see the unshare call and the call manager at A will see the unshare event.

4. The chalkboard application is processed in the same way as the chat application.

5. Finally, the user A hangs up, the call manager at A will issue an unshare, so ending the call.

Structure of a Well-Behaved Application

One of the main aims of the Call Manager design is to simplify the structure of an aware application. Since the Call Manager looks after making a call, issuing share and unshare calls and so on, a typical application need only:

register_app at start up. If the return code indicates no call manager is present, the application should inform the user and then terminate.

after registering successfully, use create_ports to establish a channel to itself (for most applications a merged channel set will be used)

allow most events to be handled in the default way when asked to terminate, first remove_ports, then optionally unshare and then deregister_app It is not normally necessary for an application to issue either share or unshare since the Call Manager will handle these, As far as events are concerned, most can be handled in a default way. For example:

SHARE_REQUEST should result in SHARE_CONFIRMED being returned, since this event is the result of a local share from the Call Manager which has already decided to accept the call. There is no need to do any other processing.

SHARE_CONFIRMED should result in RC_OK but can otherwise be ignored.

SHARE_REJECTED should not occur (since all SHARE_REQUESTs should be accepted).

SHUT_DOWN should result in RC_OK and the application should then either terminate (in an OS/2 PM environment by posting a WM_QUIT message to itself for example) or at least no longer issue API calls.

UNSHARE should result in RC_OK but can otherwise be ignored.

We claim:

1. A programmable workstation for collaborative working in a network in which workstations represent nodes of the network, the network being connected by physical links for supporting communications between nodes, each node including an operating system and application programs, and potentially having at plurality of call manager programs responsible for handling incoming communications which are not specific to a particular application program instance running at the node, wherein only one call manager can be active at a node at any given time;

the workstation comprising:

a network control program layer, running on the operating system, for controlling physical routing of said communications between nodes; and a collaborative application subsystem for interfacing with the application programs running on the workstation, said collaborative application subsystem being responsive to a predetermined application program call from a call manager program running on the workstation to establish that call manager program as the active call manager program at the node to handle incoming events which are not specific to any application program instance at the node.

2. A workstation as claimed in claim 1 in which, if a call manager is already active at the node, the predetermined application program call is directed to the currently active call manager which, at its option, may transfer handling of incoming events to the call manager from which said predetermined application program call originated.

3. A workstation as claimed in claim 1 or claim 2 in which incoming communications which are specific to an application instance are passed directly to that instance.

4. A workstation as claimed in claim 1 or 2, wherein the call manager in response to an incoming non-application specific event passed to it by the collaborative application subsystem naming an application program, directs the event to an existing instance of the named application, launches a new instance of the named application or handles the event itself.

5. A method of collaborative working in a network in which programmable workstations represent nodes of the network, the network being connected by physical links for supporting communications between nodes, each node including an operating system and application programs and potentially having a plurality of call manager programs responsible for handling incoming communications which are not specific to a particular application program instance running at the node, wherein only one call manager can be active at a node at any given time, each workstation including a collaborative application support system for interfacing with applications running on the workstation, the method comprising:

receiving, at the collaborative application support system, a predetermined application program call from a call manager program running on the workstation, and establishing, responsive to said predetermined application program call, the call manager program as being the active call manager at that node responsible for handling incoming communications which are not specific to any application program running at the node.

6. A method as claimed in claim 5 in which, if a call manager is already active at the node, the predetermined application program call is directed to the currently active call manager, which, at its option, may transfer handling of incoming events to the call manager from which said predetermined application program call was received.

7. A method as claimed in claim 5 or claim 6 in which incoming communications which are specific to an application instance are passed directly to that instance.

8. A method as claimed in any one of claims 5 to 6 in which the call manager responds to an incoming non-application specific event naming an application program by directing the event to an existing instance of the named application, launching a new instance of the named application or handling the event itself.

* * * * *